US012086532B2

(12) United States Patent
Gorman et al.

(10) Patent No.: US 12,086,532 B2
(45) Date of Patent: Sep. 10, 2024

(54) GENERATING CASCADED TEXT FORMATTING FOR ELECTRONIC DOCUMENTS AND DISPLAYS

(71) Applicant: Cascade Reading, Inc., Edina, MN (US)

(72) Inventors: Michael Gorman, Edina, MN (US); Mark Lacek, Minneapolis, MN (US); Kashif Riaz, Eagan, MN (US); Julie A. Van Dyke, New Haven, CT (US)

(73) Assignee: Cascade Reading, Inc., Edina, MN (US)

( * ) Notice: Subject to any disclaimer, the term of this patent is extended or adjusted under 35 U.S.C. 154(b) by 0 days.

(21) Appl. No.: 17/917,171

(22) PCT Filed: Apr. 7, 2021

(86) PCT No.: PCT/US2021/026270
§ 371 (c)(1),
(2) Date: Oct. 5, 2022

(87) PCT Pub. No.: WO2021/207422
PCT Pub. Date: Oct. 14, 2021

(65) Prior Publication Data
US 2023/0123328 A1 Apr. 20, 2023

Related U.S. Application Data

(60) Provisional application No. 63/006,633, filed on Apr. 7, 2020.

(51) Int. Cl.
*G06F 40/00* (2020.01)
*G06F 40/106* (2020.01)
(Continued)

(52) U.S. Cl.
CPC .......... *G06F 40/106* (2020.01); *G06F 40/117* (2020.01); *G06F 40/205* (2020.01); *G06F 40/253* (2020.01); *G06F 40/289* (2020.01)

(58) Field of Classification Search
CPC .... G06F 40/106; G06F 40/253; G06F 40/205; G06F 40/289; G06F 40/117
See application file for complete search history.

(56) References Cited

U.S. PATENT DOCUMENTS 4,889,422 A † 12/1989 Pavlidis
5,778,402 A * 7/1998 Gipson ................. G06F 40/166
715/201

(Continued)

FOREIGN PATENT DOCUMENTS

CN 112686051 A 4/2021
CN 115769219 A 3/2023
(Continued)

OTHER PUBLICATIONS

Warschauer, Mark et al.; Transforming Digital Reading With Visual-Syntactic Text Formatting, Jalt Call Journal ISSN 1832-4215, vol. 7 No. 3, pp. 255-269, Jun. 2011. (Year: 2011).*

(Continued)

*Primary Examiner* — Barbara M Level
(74) *Attorney, Agent, or Firm* — Schwegman Lundberg & Woessner, P.A.

(57) ABSTRACT

Various examples of approaches for using and implementing cascaded text formatting within electronic publishing and display mediums are described herein. In an example, a method for analyzing and re-formatting a stream of text, includes: obtaining a stream of human-readable text in a natural language processing (NLP) parser to identify parts-of-speech and key phrases in a proper sentence; tagging the identified parts-of-speech according to the respective parts and key phrases; generating a text cascade arrangement for (Continued)

a display of the proper sentence by applying predefined rules to the part-of-speech and key phrases, where such a display of the proper sentence provides breaks and cascading, including indentations, according to the pre-defined rules; and outputting an electronic display of the proper sentence which includes the text cascade arrangement. Other examples of methods of converting text, formatting text, and displaying text, with such text cascade arrangements and related formats, are also disclosed.

15 Claims, 24 Drawing Sheets

(51) Int. Cl.
*G06F 40/117* (2020.01)
*G06F 40/205* (2020.01)
*G06F 40/253* (2020.01)
*G06F 40/289* (2020.01)

(56) References Cited

U.S. PATENT DOCUMENTS

| | | |
|---|---|---|
| 5,802,533 A | 9/1998 | Walker |
| 6,088,711 A * | 7/2000 | Fein .................. G06F 40/253 |
| | | 715/269 |
| 6,279,017 B1 | 8/2001 | Walker |
| 6,568,939 B1 | 5/2003 | Edgar |
| 7,036,075 B2 | 4/2006 | Walker |
| 7,069,508 B1 | 6/2006 | Bever et al. |
| 7,346,489 B1 | 3/2008 | Bever et al. |
| 7,743,324 B1 | 6/2010 | Bever et al. |
| 7,765,471 B2 | 7/2010 | Walker |
| 7,823,061 B2 | 10/2010 | Chan |
| 7,861,163 B2 | 12/2010 | Walker |
| 8,019,590 B1 | 9/2011 | Kinder |
| 8,190,419 B1 | 5/2012 | Kinder |
| 8,200,487 B2 | 6/2012 | Peters et al. |
| 8,209,601 B2 | 6/2012 | Bever et al. |
| 8,306,356 B1 | 11/2012 | Bever et al. |
| 8,332,221 B2 | 12/2012 | Peters et al. |
| 8,418,057 B2 | 4/2013 | Knight et al. |
| 8,442,814 B2 | 5/2013 | Ceusters et al. |
| 8,731,905 B1 | 5/2014 | Tsang et al. |
| 8,918,718 B2 | 12/2014 | Burgess |
| 9,026,907 B2 | 5/2015 | Lum |
| 9,069,731 B2 | 6/2015 | Stern et al. |
| 9,128,906 B2 | 9/2015 | Peters et al. |
| 9,292,494 B2 | 3/2016 | Ceusters et al. |
| 9,378,201 B2 | 6/2016 | Kinder |
| 9,390,080 B2 | 7/2016 | Walker |
| 9,430,555 B2 * | 8/2016 | Duncan .............. G06Q 30/0601 |
| 9,478,146 B2 | 10/2016 | Skinner et al. |
| 9,529,795 B2 | 12/2016 | Kondadadi et al. |
| 9,672,788 B2 | 6/2017 | Rosen et al. |
| 9,916,295 B1 | 3/2018 | Crawford |
| 9,940,317 B2 | 4/2018 | Walker |
| 9,953,026 B2 | 4/2018 | Kinder |
| 10,062,295 B2 | 8/2018 | Puvanachandran et al. |
| 10,102,182 B2 | 10/2018 | Lum |
| 10,180,936 B2 | 1/2019 | Mcclintock et al. |
| 10,303,742 B2 | 5/2019 | Joshi |
| 10,311,135 B1 | 6/2019 | Yang |
| 10,515,138 B2 | 12/2019 | Walker |
| 10,650,089 B1 * | 5/2020 | Walker .................. G06F 40/211 |
| 11,170,154 B1 | 11/2021 | Van Dyke et al. |
| 11,200,413 B2 | 12/2021 | Burdick et al. |
| 11,734,491 B2 | 8/2023 | Van Dyke et al. |
| 2003/0093275 A1 | 5/2003 | Polanyi et al. |
| 2006/0129922 A1 * | 6/2006 | Walker .................. G09B 17/04 |
| | | 715/251 |
| 2008/0222518 A1 | 9/2008 | Walker |
| 2010/0128042 A1 * | 5/2010 | Confrey .................. G06T 13/00 |
| | | 345/473 |
| 2010/0332217 A1 * | 12/2010 | Wintner ................ G06F 40/211 |
| | | 704/9 |
| 2012/0303371 A1 | 11/2012 | Labsky et al. |
| 2013/0035961 A1 | 2/2013 | Yegnanarayanan |
| 2013/0041685 A1 | 2/2013 | Yegnanarayanan |
| 2013/0297347 A1 | 11/2013 | Cardoza et al. |
| 2015/0213634 A1 * | 7/2015 | Karmarkar ............ G06T 11/001 |
| | | 345/589 |
| 2015/0262580 A1 * | 9/2015 | Bisani ..................... G10L 15/26 |
| | | 704/235 |
| 2015/0286618 A1 | 10/2015 | Walker |
| 2015/0348538 A1 | 12/2015 | Donaldson |
| 2016/0062982 A1 | 3/2016 | Wroczynski et al. |
| 2016/0111016 A1 * | 4/2016 | Govindaraj ............ G09B 19/00 |
| | | 434/156 |
| 2016/0188558 A1 | 6/2016 | Shikawa et al. |
| 2017/0046311 A1 * | 2/2017 | Walker .................. G06F 40/253 |
| 2017/0097987 A1 | 4/2017 | Bao et al. |
| 2017/0097988 A1 | 4/2017 | Bao et al. |
| 2017/0358238 A1 | 12/2017 | Casutt |
| 2018/0096625 A1 | 4/2018 | Kochura et al. |
| 2018/0253280 A1 | 9/2018 | Kawahara et al. |
| 2019/0019509 A1 | 1/2019 | Lee et al. |
| 2019/0087239 A1 | 3/2019 | Adibowo |
| 2019/0236085 A1 | 8/2019 | Galitsky |
| 2020/0097502 A1 | 3/2020 | Trim et al. |
| 2020/0243076 A1 | 7/2020 | Kim |
| 2020/0286463 A1 | 9/2020 | Galitsky |
| 2021/0019364 A1 * | 1/2021 | Govindjee ............. G06F 16/34 |
| 2021/0056263 A1 | 2/2021 | Xia et al. |
| 2021/0056952 A1 | 2/2021 | Van Der Ploeg et al. |
| 2021/0073302 A1 | 3/2021 | Srinivasaraghavan et al. |
| 2021/0173893 A1 | 6/2021 | Luo |
| 2021/0200965 A1 | 7/2021 | Yerli |
| 2021/0225358 A1 | 7/2021 | Monge et al. |
| 2021/0295829 A1 | 9/2021 | Noel et al. |
| 2021/0327415 A1 | 10/2021 | Park et al. |
| 2022/0051665 A1 | 2/2022 | Bade et al. |
| 2022/0059077 A1 | 2/2022 | Thomson |
| 2022/0068279 A1 | 3/2022 | Embar et al. |
| 2022/0115018 A1 | 4/2022 | Desserrey et al. |
| 2022/0335203 A1 * | 10/2022 | Van Dyke ............. G06F 40/295 |
| 2023/0351090 A1 | 11/2023 | Van Dyke et al. |

FOREIGN PATENT DOCUMENTS

| | | |
|---|---|---|
| DE | 212021000356 U1 | 1/2023 |
| EP | 0917698 B1 | 7/2007 |
| KR | 20160115566 A | 10/2016 |
| WO | WO-2017058298 A1 | 4/2017 |
| WO | WO-2021207422 A1 | 10/2021 |
| WO | WO-2023059818 A1 | 4/2023 |

OTHER PUBLICATIONS

"U.S. Appl. No. 17/233,339, Examiner Interview Summary mailed Aug. 20, 2021", 3 pgs.
"U.S. Appl. No. 17/233,339, Non Final Office Action mailed Jun. 24, 2021", 11 pages.
"U.S. Appl. No. 17/233,339, Notice of Allowance mailed Sep. 17, 2021", 5 pgs.
"U.S. Appl. No. 17/233,339, Response filed Sep. 3, 2021 to Non Final Office Action mailed Jun. 24, 2021", 19 pages.
"U.S. Appl. No. 17/453,763, Preliminary Amendment filed Feb. 23, 2022".
"International Application Serial No. PCT/US2021/026270, International Search Report mailed Aug. 2, 2021", 3 pgs.
"International Application Serial No. PCT/US2021/026270, Written Opinion mailed Aug. 2, 2021", 7 pgs.
"International Application Serial No. PCT/US2022/024070, International Search Report mailed Jul. 25, 2022", 5 pgs.
"International Application Serial No. PCT/US2022/024070, Written Opinion mailed Jul. 25, 2022", 4 pgs.
Beckman, Mary E, "The Parsing of Prosody", Language and Cognitive Processes, 11:1-2, (1996), 17-67.

(56) References Cited

OTHER PUBLICATIONS

Breen, Mara, et al., "Acoustic correlates of information structure", Language and Cognitive Processes, 25:7, [Online]. Retrieved from the Internet: <URL: http://dx.doi.org/10.1080/01690965.2010.504378>, (2010), 1044-1098.

Craven, Timothy C., "Graphic display of larger sentence dependency structures", Journal of the American Society for Information Science 42, No. 5 (1991), 323-331.

Fougeron, Cecile, et al., "Articulatory strengthening at edges of prosodic domains", J. Acoust. Soc. Am., vol. 101, No. 6,, (1997), 3728-3740.

Klatt, Dennis, "Vowel lengthening is syntactically determined in a connected discourse", Journal of Phonetics, 3, (1975), 129-140.

Lehiste, Ilse, "Influence of fundamental frequency pattern on the perception of duration", Journal of Phonetics, 4, (1976), 113-117.

Pierrehumbert, Janet, "The Phonology and Phonetics of English Intonation (Thesis)", MIT, (1980), 402 pgs.

Price, Patti, et al., "The Use of Prosody in Syntactic Disambiguation", (1991), 372-377.

Tate, Tamara, et al., "Visual-Syntactic Text Format: Improving Adolescent Literacy", Scientific Studies of Reading, 23(4), [Online]. Retrieved from the Internet: <URL: https://escholarship.org/uc/item/4vw2g0m6>, (2019), 19 pgs.

Walker, Stand, et al., "Visual-Syntactic Text Formatting: A New Method to Enhance Online Reading", Reading Online, ISSN, [Online] Retrieved from the internet: <http://www.liveink.com/VSTF_ReadingOnline_IRA_2005_Walker.pdf>, (May 2005), 1096-1232.

"U.S. Appl. No. 17/453,763, Non Final Office Action mailed Dec. 19, 2022", 7 pgs.

"U.S. Appl. No. 17/453,763, Notice of Allowance mailed Apr. 3, 2023", 9 pgs.

"U.S. Appl. No. 17/453,763, Response filed Mar. 20, 2023 to Non Final Office Action mailed Dec. 19, 2022", 9 pgs.

"International Application Serial No. PCT/US2021/026270, International Preliminary Report on Patentability mailed Oct. 20, 2022", 9 pgs.

"International Application Serial No. PCT/US2022/045924, International Search Report mailed Jan. 26, 2023", 3 pgs.

"International Application Serial No. PCT/US2022/045924, Written Opinion mailed Jan. 26, 2023", 3 pgs.

"Software—Stanford Parser", The Stanford Natural Language Processing Group, [Online]. Retrieved from the Internet: <URL: https://nlp.stanford.edu/software/lex-parser.shtml>, (Accessed May 30, 2023), 14 pgs.

"Universal Dependency Relations", UD version 2, [Online]. Retrieved from the Internet: <URL: https://universaldependencies.org/u/dep/index.html>, (Accessed May 30, 2023), 3 pgs.

Arlot, Sylvain, et al., "A survey of cross-validation procedures for model selection", Statistics Surveys, vol. 4, (2010), 40-79.

Arsi, Hiba, et al., "Using Machine Learning Algorithms for Breast Cancer Risk Prediction and Diagnosis", Procedia Computer Science, 83, (2016), 1064-1069.

Bone, Daniel, et al., "Use of machine learning to improve autism screening and diagnostic instruments: effectiveness, efficiency, and multi-instrument fusion", Journal of Child Psychology and Psychiatry, vol. 57, Issue 8, pp. 927-937, (2016), 24 pgs.

Cooper, William, et al., "Acoustical aspects of contrastive stress in question-answer contexts", J. Acoust. Soc. Am., 77(6), (1985), 2142-2156.

Cooper, William, et al., "Syntax and Speech", Cognitive Science Series, vol. 3. Harvard University Press, [Online]. Retrieved from the Internet: <URL: https://www.hup.harvard.edu/catalog.php?isbn=9780674283947>, (1980), 288 pgs.

Eady, Stephen, et al., "Speech intonation and focus location in matched statements and questions", J. Acoust. Soc. Am., 80(2), (1986), 402-415.

Fry, D B, "Duration and Intensity as Physical Correlates of Linguistic Stress", J. Acoust. Soc. Am., 27(4), (Jul. 1955), 765-768.

Guyon, Isabelle, et al., "Gene Selection for Cancer Classification using Support Vector Machines", Machine Learning, vol. 46, Issue 1-3, [Online]. Retrieved from the Internet: <URL: https://doi.org/10.1023/A:1012487302797>, (Mar. 11, 2002), 389-422.

Hoeks, John, et al., "Processing Coordinated Structures in Context: The Effect of Topic-Structure on Ambiguity Resolution", Journal of Memory and Language, 46, (2002), 99-119.

Huang, C, et al., "An assessment of support vector machines for land cover classification", International Journal of Remote Sensing, vol. 23, Issue 4, (2002), 725-749.

Jackendoff, Ray, X Syntax: A study of Phrase Structure, 248 pages, Cambridge, Mass. MIT Press, (1977), 132 pgs.

James, Gareth, et al., "Chapter 5 Resampling Methods", An Introduction to Statistical Learning: with Applications in R, Springer Texts in Statistics, (2013), 175-201.

Kaan, Edith, et al., "L2 Prediction during complex sentence processing", J Cult Cogn Sci., 3, [Online]. Retrieved from the Internet: <URL: https://doi.org/10.1007/s41809-019-00038-0>, (2019), 203-216.

Kerkhofs, Roel, et al., "Discourse, Syntax, and Prosody: The Brain Reveals an Immediate Interaction", Journal of Cognitive Neuroscience, 19:9. Massachusetts Institute of Technology, (2007), 1421-1434.

Kochanski, G, et al., "Loudness predicts prominence: Fundamental frequency lends little", J. Acoust. Soc. Am., 118(2), (Aug. 2005), 1038-1054.

Lehiste, Iise, "Rhythmic units and syntactic units in production and perception", J. Acoustic. Soc. Am., 54(5), (1973), 1228-1234.

Lehiste, Iise, et al., "Role of duration in disambiguating syntactically ambiguous sentences", J. Acoust. Soc. Am., 60(5), (Nov. 1976), 1199-1202.

Lieberman, Philip, "Some Acoustic Correlates of Word Stress in American English", J. Acoust. Soc. Am., 32(4), (Apr. 1960), 451-454.

Miller, Justin, et al., "A Longitudinal Study of the Development of Reading Prosody as a Dimension of Oral Reading Fluency in Early Elementary School Children", Read Res Q., 43(4), pp. 336-354, (2008), 29 pgs.

Street, Lynn, "Acoustic determinants of phrase boundary perception", J. Acoust. Soc. Am., 64(6), (1978), 1582-1592.

Turk, Alice, et al., "Multiple targets of phrase-final lengthening in American English words", Journal of Phonetics 35, (2007), 445-472.

Turk, Alice, et al., "The domain of accentual lengthening in American English", Journal of Phonetics, 25, (1997), 25-41.

Vapnik, Vladimir, "An Overview of Statistical Learning Theory", IEEE Transactions on Neural Networks, vol. 10, No. 5, (Sep. 1999), 988-999.

Walker, Randall, et al., "Live Ink®: Brain-Based Text Formatting Raises Standardized Reading Test Scores", National Educational Computing Conference, (2005), 35 pgs.

Walker, Randall C, et al., "Visual-syntactic text formatting: Theoretical basis and empirical evidence for impact on human reading", In IEEE International Professional Communication Conference, (2007), 1-14.

Watson, Duane, et al., "The Role of Syntactic Obligatoriness in the Production of Intonational Boundaries.", Journal of Experimental Psychology: Learning, Memory, and Cognition, vol. 32, No. 5, [Online]. Retrieved from the Internet: <URL: http://tedlab.mit.edu/tedlab_website/researchpapers/Watson_et_al_2006_JEPLMC.pdf>, (2006), 1045-1056.

Wightman, Colin, et al., "Segmental durations in the vicinity of prosodic phrase boundaries", J. Acoust. Soc. Am., 91(3), (Mar. 1992), 1707-1717.

U.S. Appl. No. 18/033,243, filed Apr. 21, 2023, Acoustic-Based Linguistically-Driven Automated Text Formatting.

"U.S. Appl. No. 18/346,609, Third-Party Submission Under 37 CFR 1.290 mailed Dec. 31, 2023", 7 pgs.

"Remote Access to Natural Language Parsing and Enhanced Text Presentation Technology for improved Reading", Small Business Innovation Research (SBIR) and Small Business Technology Transfer (STTR) program, [Online] Retrieved from the internet: <www.sbir.gov/sbiresearch/detail/348797>, (2002), 2 pgs.

Chomsky, Noam, "Syntactic Structures", The Mouton Co. Publishers, The Hague, Netherlands. ISBN 90 279, (1957), 7 pgs.

(56) References Cited

OTHER PUBLICATIONS

Frey, Aline, et al., "Perceptual span, visual span, and visual attention span: Three potential ways to quantify limits on visual processing during reading", Visual Cognition, vol. 26, No. 6, (May 11, 2018), 412-429.

Jablonkai, R Reka, et al., "The Routledge Handbook of Corpora and English Language Teaching and Learning", Chapter 32, Section4; Visual Syntactic Text formatting and Syntactic Processing, Professor of Applied Linguistics and Asian Studies at Pennsylvania State University, J. Elllot Casal, postdoctoral scholar at Case Western Reserve University Department, (Jul. 28, 2022), 5 pgs.

Kuncoro, Adhiguna, et al., "What Do Recurrent Neural Network Grammars Learn About Syntax?", arXiv:1611.05774v2, (Jan. 10, 2017), 10 pgs.

Milekic, Slavoljub, "Using gaze actions to interact with a display", U.S. Pat. No. 7,561,143B1, Application granted. Independent Claims 1, 21, 22, (Jul. 14, 2009), 22 pgs.

Rayner, Keith, "The Role of Eye Movements in Learning to Head and Reading Disability", Remedial and Special Education, 6(6), [Online] Retrieved from the internet: <https://doi.org/10.1177/074193258500600609>, 8 pgs.

Reichle, Erik, et al., "The E-Z Reader model of eye-movement control in reading: Comparisons to other models", Behavioral and Brain Sciences, 26, (2003), 445-476.

Veldre, Aaron, et al., "Understanding the Visual Constraints on Lexical Processing: New Empirical and Simulation Results", Journal of Experimental Psychology: General, vol. 152, No. 3. American Psychological Association., (2023), 693-722.

"U.S. Appl. No. 17/453,763, Corrected Notice of Allowability mailed Jul. 27, 2023", 5 pgs.

Chomsky, Carol, "Reading, Writing and Phonology", Harvard Educational Review, 40(2), (1970), 287-309.

"U.S. Appl. No. 18/033,243, Non Final Office Action mailed Jun. 6, 2024", 14 pgs.

"International Application Serial No. PCT/US2022/045924, International Preliminary Report on Patentability mailed Apr. 18, 2024", 6 pgs.

Gao, Wei, et al., "Visual-Syntactic Text Formatting: Developing EFL Learners' Reading Fluency Components", Journal of Psycholinguistic Research, 51, (2022), 707-727.

Ozaki, Sachiko, et al., "The effects of digital scaffolding on adolescent English reading in Japan: An experimental study on visual-syntactic text formatting", The Jalt Call Journal: Regular Papers, vol. 16, No. 3, (2020), 147-165.

Park, Youngmin, et al., "Scaffolding learning of language structures with visual-syntactic text formatting", British Journal of Educational Technology, vol. 0 No 2018, [Online]. Retrieved from the Internet: <URL: https://escholarship.org/uc/item/6235t25b>, (Jul. 1, 2019), 1-17.

Warschauer, Mark et al.; Transforming Digital Reading With Visual-Syntactic Text Formatting, Jalt Call Journal ISSN 1832-4215, vol. 7 No. 3, pp. 255-269, Jun. 2011. (Year: 2011), pp. 260-261. DOI: 10.29140/jaitcall.v7n3.j121 https://castledown.online/reference/jaltcall-v7n3-121/.†

"International Application Serial No. PCT/US2021/026270, Written Opinion dated Aug. 2, 2021", 7 pgs.†

Slavoljub Milekic U.S. Pat. No. 7,561,143B1 Using gaze actions to interact with a display. Jul. 14, 2009 Application granted. Independent Claims 1, 21, 22.†

Rayner, K. (1985). The Role of Eye Movements in Learning to Read and Reading Disability. Remedial and Special Education, 6(6), 53-60. https://doi.org/10.1177/074193258500600609.†

"International Application Serial No. PCT/US2021/026270, International Search Report dated Aug. 2, 2021", 3 pgs.†

Stan Walker, Phil Schloss, Charles R. Fletcher, Charles A. Vogel, and Randall C. Walker. "Visual-syntactic text formatting: A new method to enhance online reading." Reading Online 8, No. 6 (2005): 1096-1232. (Year: 2005). https://www.liveink.com/VSTF_ReadingOnline_IRA_2005_Walker.pdf†

\* cited by examiner
† cited by third party

*FIG. 22*

GENERATING CASCADED TEXT FORMATTING FOR ELECTRONIC DOCUMENTS AND DISPLAYS

PRIORITY CLAIM

This application is a U.S. National Stage Filing under 35 U.S.C. 371 from International Application No. PCT/US2021/026270, filed Apr. 7, 2021, and published as WO 2021/207422 on Oct. 14, 2021, which application claims the benefit of priority to U.S. Provisional Patent Application No. 63/006,633, filed Apr. 7, 2020, which are incorporated by reference herein in their entirety.

BACKGROUND

Various approaches may be employed in the technical fields of document publishing and user interface displays to attempt an intelligent output and format of digital text content. One such approach for document arrangements involves the use of cascaded text formatting. Cascaded text formatting transforms conventional block-shaped text into cascading patterns for the purpose of helping readers identify grammatical structure and increase reading comprehension. In one study, students who read texts formatted in cascaded format for less than one hour a week showed small yet statistically significant gains in their overall English language arts achievement and in their writing skills. See Tate et al, 2019, Visual-Syntactic Text Format: Improving Adolescent Literacy, Visual-Syntactic Text Format: Improving Adolescent Literacy, Journal of Scientific Studies of Reading, Volume 23, 2019-Issue 4.

A cascaded text format aims to assist with both visual and syntactic processing in reading. Visually, the eyes typically capture only a limited width of characters of text at each fixation, in the range of about 9 to 15 characters. Because of this limited field of view, attentional processing is strained as readers try to move their reading field of view across the page and down multiple rows of homogeneous block text. The cascaded text display reduces this problem by: i) breaking text into shorter rows, (for example about 8 to 30 characters across), that fit into one or two fixation eye spans; and ii) using varied indentation patterns that guide the eyes from row to row.

The cascaded text formatting also helps readers identify the syntactic structure of a sentence. Syntax is more complex than a simple, concatenated sequence of one phrase after another; rather, it is hierarchical. The human mind's capacity to build sentences through the recursive process of nesting language units inside other units is the essential feature that enables human language to represent an infinite number of meanings. Therefore, when parsing natural language in written form, the reader's mind must do more than simply "chunk" the sentence into a string of smaller units. Rather, the reader's mind needs to determine how each phrase is nested inside larger phrase and clause structures, and how each nested phrase relates to the larger one containing it. Accordingly, this cascaded-parsing pattern has been designed to enable the reader, when looking at a particular phrase, to perceive simultaneously the relative indentation of the phrases above and below it. These combined visual and syntactic effects also enable the "mind's eye" to build and examine a larger and more enduring visual image of the sentence while reading.

Prior approaches for generating cascaded text have involved the use of human-authored, handwritten rules, such as the use of manual rules that are applied for identifying part-of-speech and phrase boundaries. While in theory handwritten rules may be devised to accommodate a large range of text and syntactical structures, the time and effort required to devise these rules presents a challenge to scalability. Applications requiring a high level of scalability include, for example, on-demand or real-time processing of text from a wide variety of sources or involving a wide range of syntactic form. In particular, challenges include previously unencountered syntax in a given language, or even different languages with different syntaxes. As a result, in the technical fields of digital publishing, graphical user interfaces, and dynamic electronic displays, there is a need for new approaches which remove dependence on handwritten or manual rules or human oversight for reformatting and displaying text.

BRIEF DESCRIPTION OF THE DRAWINGS

To easily identify the discussion of any particular element or act, the most significant digit or digits in a reference number refer to the figure number in which that element is first introduced.

FIG. 22 illustrates an example of a dependency tree for natural language processing of text, in accordance with one embodiment.

DETAILED DESCRIPTION

Figure 1:
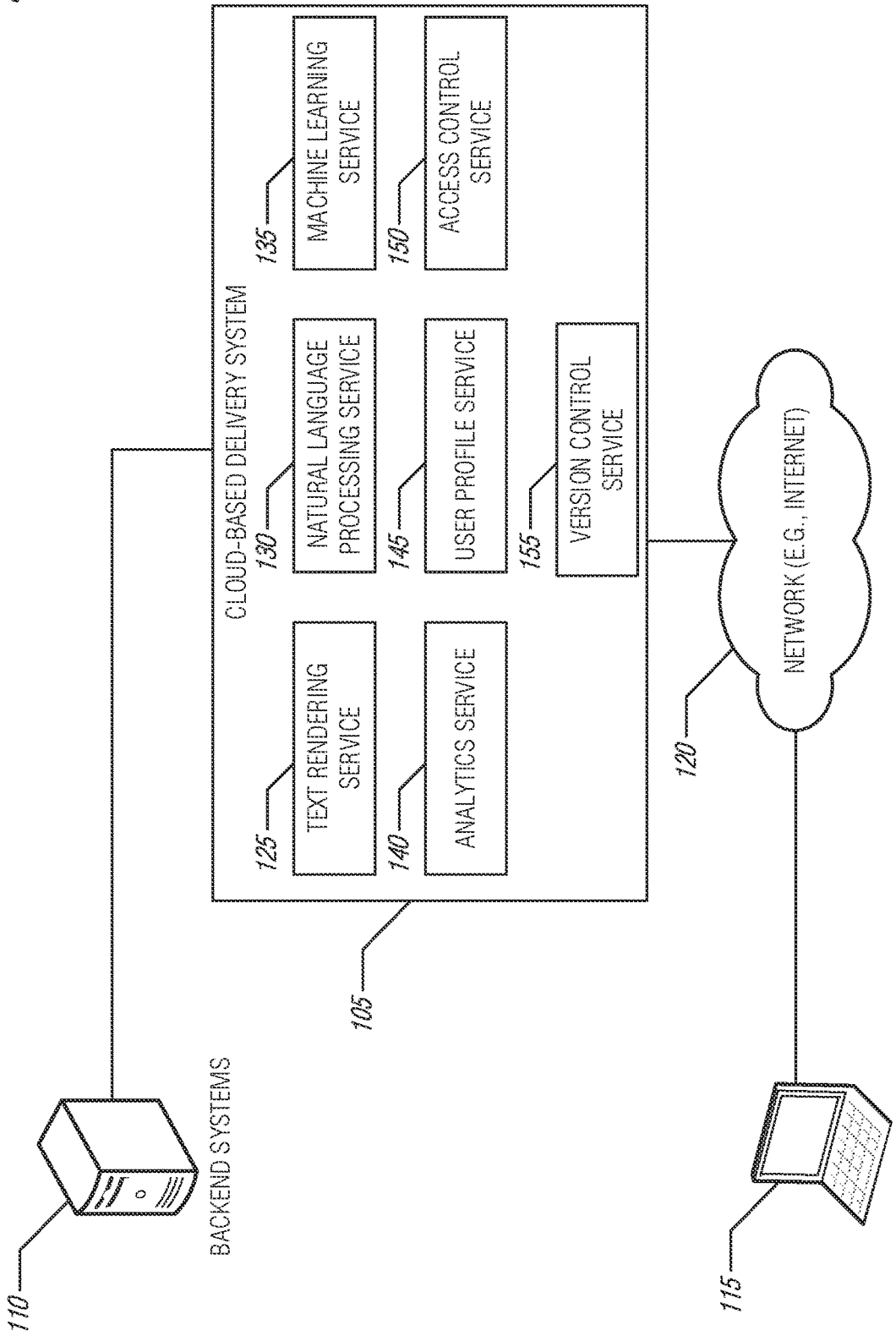
FIG. 1 illustrates an environment and system for preparing sentences of human-readable text to display in a cascaded format, in accordance with one embodiment.

As described herein, there are provided various embodiments of computer-implemented systems and methods for generating cascaded text displays, including within graphical user interfaces, digital publications and files, and electronic display outputs. According to one embodiment, machine learning (ML) is employed to automatically learn syntactical rules to generate syntactical information through the analysis of large corpora of typical real-world examples. An ML model or models generated from this learning phase are in turn used to automatically generate syntactical and other information for a segment of text, that in turn may be used in whole or in part in combination with explicit rules, for example handwritten or manual rules, to generate cascaded text formats for block text.

According to one embodiment, many different classes of machine-learning algorithms may be been applied to natural-language-processing tasks in support of the generation of cascaded text displays. These algorithms take as input a large set of "features" that are generated from the input data. Some of the earliest-used algorithms, such as decision trees, produced systems of hard if-then rules similar to the systems of handwritten rules that were then common. Increasingly, however, research has focused on statistical models, which make soft, probabilistic decisions based on attaching real-valued weights to each input feature. Such models have the advantage that they may express the relative certainty of many different possible answers rather than only one, producing more reliable results when such a model is included as a component of a larger system. As will be understood, probabilistic models incorporate random variables and probability distributions into the model of an event or phenomenon. While a deterministic model gives a single possible outcome for an event, a probabilistic model gives a probability distribution as a solution. Statistical inference is the process of using data analysis to deduce properties of an underlying distribution of probability. Statistics draws population inferences from a sample, and machine learning finds generalizable predictive patterns.

According to one embodiment, a system disclosed herein and using machine-learning algorithms and models, applied within electronic publishing and display mediums, provides numerous technical advantages over solutions primarily relying on handwritten rules. For example, the learning procedures used during machine learning automatically focus on the most common cases, whereas when writing rules by hand it is often not at all obvious where the effort should be directed. In addition, the automatic learning procedures may make use of statistical inference algorithms to produce models that are robust for handling unfamiliar input from a text stream (e.g. containing words or structures that have not been seen before) and for handling erroneous input from a text stream (e.g. with misspelled words or words accidentally omitted). Generally, handling such input gracefully with handwritten rules, or, more generally, creating systems of handwritten rules that make soft decisions, is extremely difficult, error-prone and time-consuming.

According to one example embodiment, an NLP (natural language processing) parser using a machine learning paradigm performs one or more of the following functions on input text, such as text provided in a text stream: syntax analysis, extraction of tokens and sentences, identifying part-of-speech, identifying key phrases and creating dependency parse trees for each sentence. Other NIL-based text analysis capabilities provided include sentiment analysis, entity recognition (e.g., people, places, custom entities), topic modeling, language detection, translation and support for technical terminology such as medical terms (e.g., as provided by the Amazon Web Services (AWS) Comprehend® feature). These engines further include multi-language capabilities to analyze text in multiple languages.

According to one example embodiment, natural language processing tasks performed by the ML-based NLP parser include: 1) grammar induction to generate a formal grammar that describes a language's syntax; 2) lemmatization to remove inflectional endings only and to return the base dictionary form of a word which is also known as a lemma; 3) morphological segmentation separates words into individual morphemes and identify the class of the morphemes; 4) part-of-speech tagging to determine, from a sentence, the part-of-speech (POS) for each word; 5) parsing to determine the parse tree (grammatical analysis) of a given sentence; 6) sentence breaking (also known as sentence boundary disambiguation) to, given a chunk of text, find the sentence boundaries; 7) stemming to reduce inflected (or sometimes derived) words to their root form; 8) word segmentation to separate a chunk of continuous text into separate words; 9) terminology extraction to automatically extract relevant terms from a given corpus; 10) semantics to determine the computational meaning of individual words in context; 11) machine translation to automatically translate text from one human language to another; 12) natural language generation to convert information from computer databases or semantic intents into readable human language; 13) natural language understanding to convert chunks of text into more formal representations such as first-order logic structures that are easier for computer programs to manipulate.

According to one embodiment, the NIL-based NLP parser is application specific, According to another example embodiment, the ML-based NLP parser is one commercially available from Amazon, Inc., Google, Inc., Stanford (CoreNLP), or any other ML-based parser now available or that may become available in the future that provides the parsing functionality referred to herein to support the various embodiments. Further, as used herein, the term "ML-based" includes any application of artificial intelligence (AI) that provides systems the ability to automatically learn and improve from experience without being explicitly programmed. Examples of ML-based algorithms, without limitation to those encompassed herein, are supervised machine learning algorithms, unsupervised machine learning algorithms, semi-supervised machine learning algorithms and reinforcement machine learning algorithms. Models that may be used in the ML-based parsers include artificial neural networks such as recurring neural networks, decision trees, support vector machines, regression analysis, Bayesian networks, genetic algorithms, and others.

According to one example embodiment, an engine described herein uses an ML-based NLP parser as the precursor/input into a cascade text formatting process. The ML-based NLP parser creates "tagged" digital text which defines the part-of-speech and key phrases in a sentence. This tagged text is used to develop the text cascade by applying display rules, described below, to the part-of-speech identified by the NLP parsing. According to one embodiment, the engine focuses on the part-of-speech and key phrases as defined by the NLP parser in the rule process so that the proper sentence breaks and cascading including indentations are defined by the rules provided and applied against the NLP output.

According to another example embodiment, a system to provide cascaded text displays may be deployed via a cloud-connected service which is operable in an online mode, in an offline mode offered as an end application which resides on a user endpoint device and which functions without wide area network (e.g. Internet) connectivity, or in a combination of both online and offline modes. As used herein, a cloud-connected service is a service delivered, offered, or propagated via a cloud computing platform that may include or be operably coupled with a front-end client executing on an end-user computing system (e.g., a desktop computer, a laptop computer, a mobile device, a tablet device, digital glasses, digital eye contacts, television, etc.), backend services (e.g., servers, storage devices, etc.), a cloud-based delivery system (cloud-enabled website, computing cluster, etc.), and a network (e.g., the internet, a private network, a cellular network, a wireless network, etc.). A cloud computing platform may provide a number of cloud delivered services including software as a service (SaaS), data as a service (DaaS), platform as a service (PaaS), and infrastructure as a service (IaaS) that provide a variety of services that may have been traditionally facilitated via on-premise hardware and software located on a local network of an end-user.

According to one example embodiment, an online mode of the cloud service provides a series of services which connect with one another via APIs, using a cloud infrastructure. Such APIs may be used to deliver According to one example embodiment, a cloud service providing cascade text tagging receives text input from a publication source (for example, online or offline publisher, magazine, newspaper, book, author, intra or internet source), tags the text with display parameters, and the tagged text is provided to a client system of an end-user viewer. In another embodiment, a publisher transmits text to an end-user reader's client system, the client system transmits the text to the cloud service, that in turn returns the tagged text to the reader's client system.

According to another example embodiment, there are provided ML engines, methods and metrics which modify cascade rules.

According to another example embodiment, there is provided user profile storage including anonymized ID for privacy and HIPPA compliance, user-input descriptors (language, demographics, contact info), performance metrics and progress tracking. In other alternate embodiments, other privacy systems are used for example to protect the privacy of young children using the systems and methods described herein According to another embodiment, stored content access is provided, including metrics on frequency, time of use, attributes (fiction, non-fiction, author, research, poetry, etc.)

According to another embodiment, there is provided version control and updating of any end user applications.

According to another embodiment, cascade tech is generated as described herein.

According to another embodiment, an end point application operates in an offline mode wherein one or more of the cascade functions may reside on the endpoint/user device wherein a user may receive cascaded text without the requirement of Internet access.

According to another example embodiment, there is provided a ML continuous improvement capability in which rules to cascade text improve with usage through machine learning, using active and passive methods.

According to another embodiment text Input/Output (I/O) methods include optical character recognition (OCR), wearable appliances such as Google Glasses® or smart contact lenses.

According to another example embodiment, a drafting/authoring tool is provided to author text and display the authored text in a cascade format.

According to still another example embodiment, there are provided systems and methods for diagnosing cognitive conditions.

According to another example embodiment, there is provided personalized/contextual formatting providing a personalized algorithm that is unique to the individual to provide formatting that is personalized for each user and the user's preferences and/or optimized for best comprehension.

According to another example embodiment, reading profiles are provided that modify the cascade formatting based on reader context such as reading speed, light levels, time or day, user manipulation, etc.

According to still another example embodiment, a reading comprehension score (RCS) used to assess and measure a user's reading ability.

According to still another example embodiment, there is provided a library of published content formatted using cascaded text.

According to yet another example embodiment, the cascaded text display capability described herein provides for cascaded text in languages other than English, including all major languages. More particularly, although example embodiments are provided showing use for display of English text, the embodiments herein are not limited to use with English text but rather are applicable to all languages.

According to still another example embodiment, spoken word is integrated with cascade format visual display such that as one is reading a cascading text there is also the spoken word reading the same text and at a controllable speed to match the individual reader's speed.

FIG. 1 illustrates an environment 100 and system 105 for preparing sentences of human-readable text to display in a cascaded format, in accordance with one embodiment. The environment may include the system 105 which may be a cloud-based delivery system. The system may be distributed amongst a variety of backend systems 110 that provide infrastructure services such as computing capacity and storage capacity for a cloud services provider hosting the system 105. The system 105 may be communicatively coupled (e.g., via wired network, wireless network, cellular network, shared bus, etc.) to a network 120 (e.g., the internet, private network, public network, etc.). An end-user computing device 115 may be communicatively connected to the network and may establish a connection to the system 105. The end-user device may communicate with the system 105 via a web-browser, downloaded application, on-demand application, etc. In an example, components of the system may be prepared for delivery to the end-user computing device 115 via an installed application providing offline access to features of the system 105.

Figure 2:
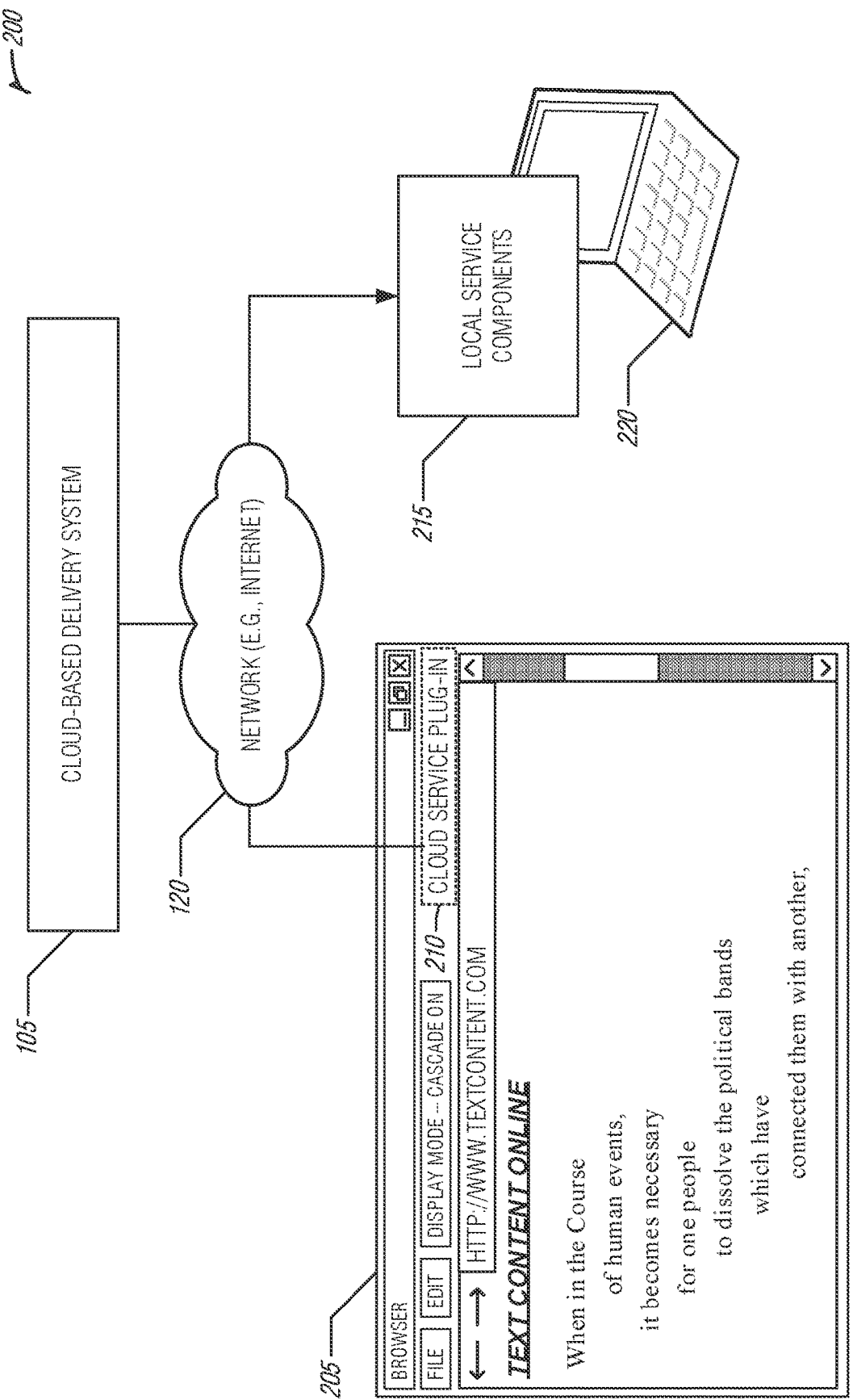
FIG. 2 illustrates an example of a plug-in-based hybrid application and offline end-user application for human-readable text to display in a cascaded format, in accordance with one embodiment.

The system 105 may provide direct online connection via the end-user computing device 115, may distribute a set of packaged services to end-user application on the end-user computing device 115 that operates offline without internet connectivity, and as a hybrid with an end-user application that connects (e.g., via a plug-in, etc.) to the cloud service over the internet. FIG. 2 illustrates an example 200 of a plug-in-based hybrid application 205 and offline end-user application 215 for human-readable text to display in a cascaded format, in accordance with one embodiment. The plug-in-based hybrid application 205 and the offline end-user application 215 may be connected to the system 105 via the network 120. A mode button 210 may be provided to allow the user to change cascade modes (e.g., off, on, learning, diagnostic, editing, etc.). While the mode button is shown in the plug-in-based hybrid application 205, it may be provided in an online application and the offline-end-user application 215. The end-user application may provide offline operation and cascade functions may reside in an application executing on the end-user computing device 220 so that a user may produce cascaded text without internet access. While the user may use the service in offline mode, activity and user choices may be logged that may be periodically uploaded to the system 105 when an internet connection is available.

Returning to the description of FIG. 1, the version control service 155 may track application versions and may provide periodic updates to the portable components provided to the application executing on the end-user computing device 115 when connected to the internet. Hybrid mode enables the user to read in cascade format regardless of connectivity, but still provides data to improve the system 105. The end-user application may be deployed in a number of forms. For example, a browser plug-in and extensions may enable users to change the formatting of the text they read on the web and in applications using the cascading format. In another example, the end-user application may be integrated into a menu bar, clip board, or text editor so that when a user highlights text using a mouse or hotkeys, a window may be presented with selected text rendered using the cascade format. In another example, the end-user application may be a portable document file (PDF) reader that may input a PDF file as an input source and may output the cascade format for display to the user. In yet another example, the end-user application may be an augmented image enhancement that translates live view from a camera and may apply optical character recognition (OCR) to convert the image to text and render the layout in cascade format in real time.

OCR capabilities may enable the user to capture an image of text via camera (e.g., on their phone, etc.) and have it instantly converted into the cascade formatted text. This may also take place via a user-worn device such as smart glasses, smart contact lenses, and the like, where input of text seen by the user is converted into cascaded format for enhanced comprehension. In this way the text may be converted in real-time by the user's personal viewing device. Augmented video (AV), augmented reality (AR), and virtual reality (VR) application of the cascade formatting may be completed within user-worn visual display devices, including AV and VR headsets, glasses, and contact lenses to allow the user to see text in the cascade format. The systems and techniques discussed herein are applicable to a variety of environments where text is rendered on a device by processing the text and converting the text to cascade formatting. Display of text on a screen requires instructions on rendering and the cascade instruction set may be inserted in the command sequence. This may apply to a document type (e.g., PDF, etc.) and to systems with a rendering engine embedded where the call to the rendering engine may be intercepted and the cascaded formatting instructions inserted.

In an example, a parallel display of the source text and the cascade formatted text may be presented via two screens or split screen in parallel presentation. For example, original source text may be displayed on one screen and the cascade text is displayed in parallel on a second screen and may be synched so when a user scrolls on either display they stay synchronized. This may be used for educational purposes to highlight syntax, key phrases, and part-of-speech or to present an "enhanced comprehension view" that is like a text X-RAY displaying the underlying structure of the text. For example, key phrases may be bolded or not bolded, verbs may be colored or bolded, etc. to highlight underlying structure.

In an example, a dual cascade display arrangement may be provided. For example, a cascade formatted passage may be displayed in one window of the screen while a translation of the passage in another language may be presented in cascaded format in a second window of the screen. In another example, block text may be displayed one side and cascade formatted text on the other side of a dual display. In yet another example, there is provided split screen scrolling and block and cascade and/or languages may be displayed on different sides of the screen or on different displays of a dual display configuration. Dual screens may allow a user to refer to the other view to assist in comprehension of difficult passages.

The system 105 may include a variety of service components that may be executing in whole or in part on various computing devices of the backend systems 110 including a text rendering service 125, a natural language processing (NLP) service 130, a machine learning service 135, an analytics service 140, a user profile service 145, an access control service 150, and a version control service 155. The text rendering service 125, the natural language processing service 130, the machine learning service 135, the analytics service 140, the user profile service 145, the access control service 150, and the version control service 155 may include instructions including application programming interface (API) instructions that may provide data input and output from and to external systems and amongst the other services.

The system 105 may operate in a variety of modes: an end-user (e.g., reader, etc.) converts text on local client using a local client that has a copy of offline components for generating cascaded text, the end-user may send text to the system 105 to convert standard text to cascaded text, a publisher may send text to the system 105 to convert its text to cascaded format, the publisher may use an offline component set of the system 105 to convert its text to cascade format, and the publisher may publish text in traditional block formatting or cascaded formatting using the system 105.

The text rendering service 125 may receive text input and may pass the text to the NLP service 130 parser to generate tags for the text to denote part-of-speech and key phrases. For example, for a given text, syntax analysis (e.g., by GOOGLE®, AMAZON®, Python libraries nltk and spaCy, etc.) may return a breakdown of words with a rich set of linguistic information for each token. The information may be divided into two parts:

Part-of-speech: This part contains information about the morphology of each token. For each word, a fine-grained analysis is returned containing its type (e.g., noun, verb, etc.), gender, grammatical case, tense, grammatical mood, grammatical voice, and much more. For example, for the input sentence "A computer once beat me at chess, but it was no match for me at kickboxing." (Emo Philips) the part-of-speech analysis is shown in Table 1.

TABLE 1

| | |
|---|---|
| A | tag: DET |
| 'computer' | tag: NOUN number: SINGULAR |
| 'once' | tag: ADV |
| 'beat' | tag: VERB mood: INDICATIVE tense: PAST |
| 'me' | tag: PRON case: ACCUSATIVE number: SINGULAR person: FIRST |
| at | tag: ADP |
| 'chess' | tag: NOUN number: SINGULAR |
| ',' | tag: PUNCT |
| 'but' | tag: CONJ |
| 'it' | tag: PRON case: NOMINATIVE gender: NEUTER number: SINGULAR person: THIRD |
| 'was' | tag: VERB mood: INDICATIVE number: SINGULAR person: THIRD tense: PAST |
| 'no' | tag: DET |
| 'match' | tag: NOUN number: SINGULAR |
| 'for' | tag: ADP |
| 'kick' | tag: NOUN number: SINGULAR |
| 'boxing' | tag: NOUN number: SINGULAR |
| '.' | tag: PUNCT |

Dependency trees: The second part of the return is called a dependency tree, which describes the syntactic structure of each sentence. A diagram of a famous Kennedy quote shows such a dependency tree in FIG. 22. For each word, the arrows indicate which words are modified by it. The above analysis may be obtained with very few lines of code. Apart from English, the syntactic analysis may support a variety of additional languages: Chinese (Simplified), Chinese (Traditional), French, German, Italian, Japanese, Korean, Portuguese, Russian, and Spanish.

According to one example embodiment, the part-of-speech and key phrases are tagged. Example tagging techniques include modification of style sheets or transmission of a cascade format style sheet to include the tagged key phrases that may be matched with cascade formatting rules to be applied. In another example embodiment, a call to text may be intercepted and rendered in cascaded format. In another example embodiment, American Standard Code for Information Interchange (ASCII) text is produced and displayed based on the cascade formatting rules. In another example embodiment, an extensible markup language (XML) file is generated for the text and XML tags are assigned to the part-of-speech and key phrases that may be used to call applicable cascade formatting rules to display the text in cascaded format in a word processing application, web browser, or other application. Universal base text code may be used across the various techniques so that break points and indents included in the cascade formatting rules may be uniformly applied to create a standard cascaded display across platforms.

Figure 3:
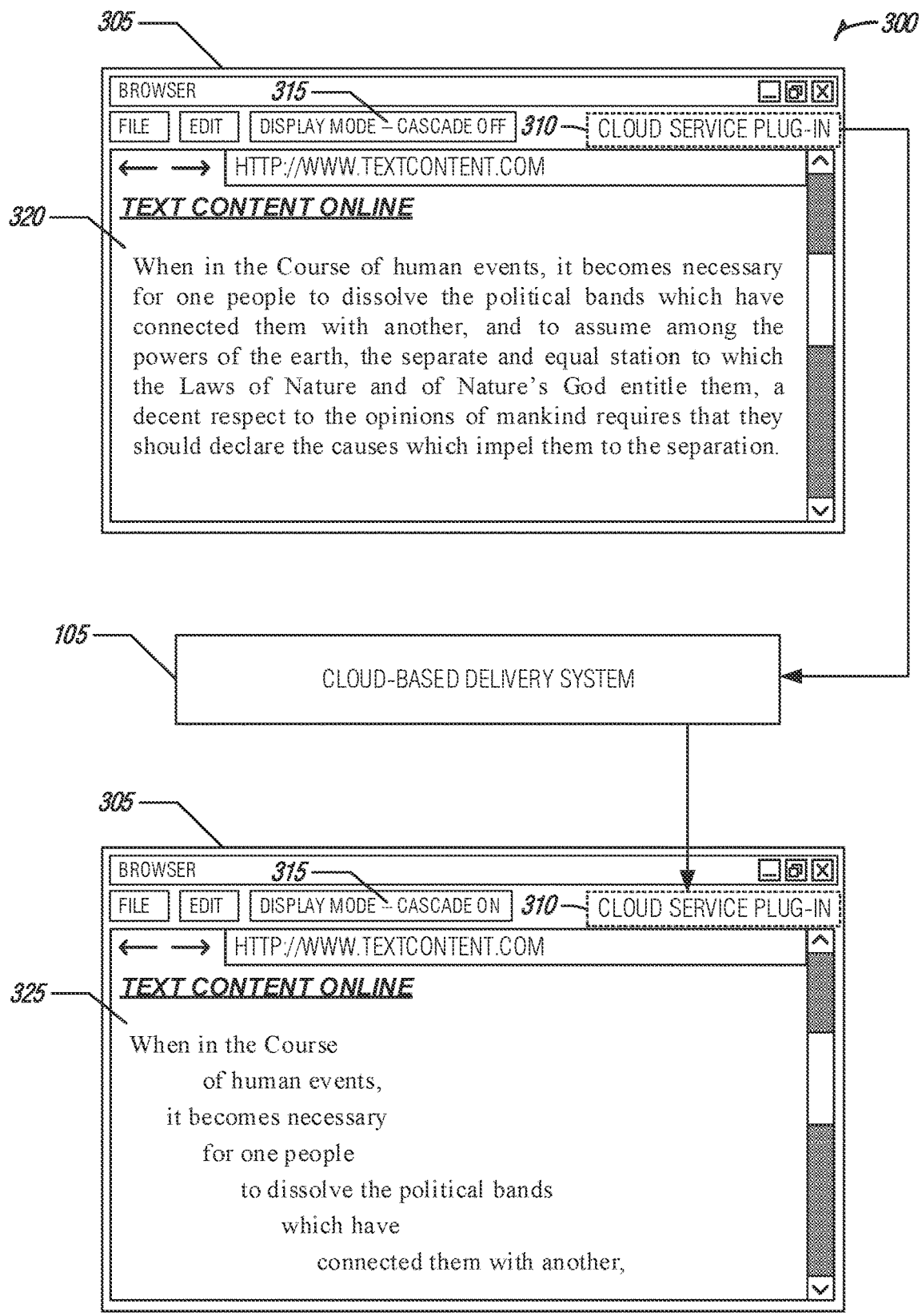
FIG. 3 illustrates an example of text transformation for displaying sentences of human-readable text in a cascaded format, in accordance with one embodiment.

The text rendering service 125 may use cascade formatting rules and algorithms for processing the text inputs. FIG. 3 illustrates an example of text transformation 300 for displaying sentences of human-readable text in a cascaded format, in accordance with one embodiment. A browser window 305 may include a plug-in 310, that is connected to the system 105, and a cascade mode button 315 when the cascade mode is off, standard text 320 may be displayed when a user views text on a website. When the cascade mode is on, the text may be formatted and displayed in cascade format 325.

Figure 4:
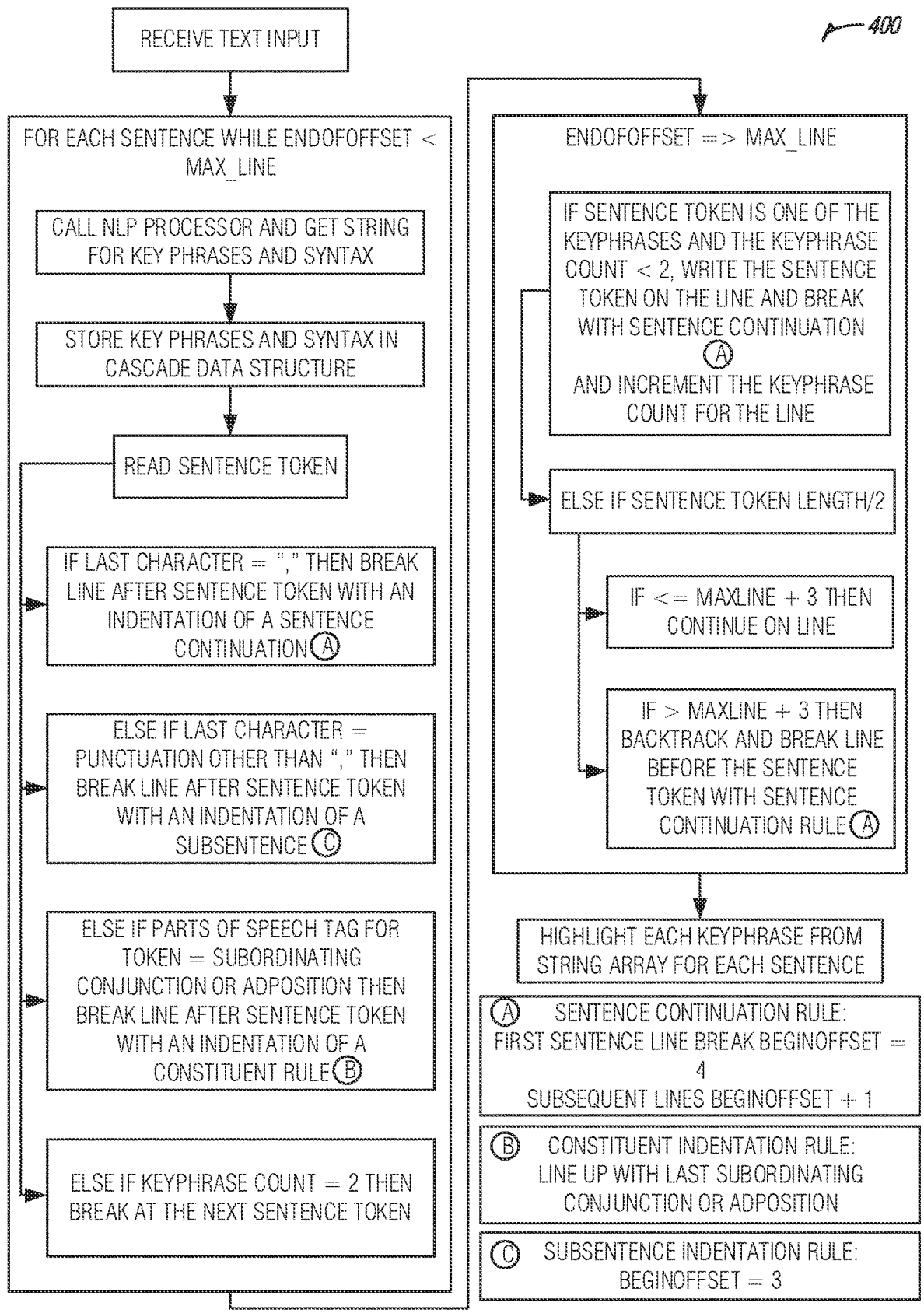
FIG. 4 illustrates a process for rendering text in a cascade format, in accordance with one embodiment.

FIG. 4 illustrates a process 400 for rendering text in a cascade format, in accordance with one embodiment. In the process 400, a Max_Line variable may be defined (e.g., 40 characters, etc.). A KeyPhrase count variable may be maintained to count a number of key phrases identified in the sentence. For each sentence (e.g., as determined by a period at the end of a sentence, etc.), an NLP processor may be called (e.g., the NLP service 130 as described in FIG. 1 with an API call to AMAZON® Comprehend, GOOGLE® Natural Language, MICROSOFT® Text Analytics, etc.) and a string may be retrieved (e.g., JSON string, etc.) for key phrases and syntax. In one example embodiment, the strings are stored in a data structure to be evaluated. A token of the sentence may be read. If the last character of the token is a "," the line may be broken after the token with an indentation rule of a sentence continuation, if the last character is punctuation other than "," the line may be broken after the token with an indentation rule of a sub sentence, if a part-of-speech tag for the token is a subordinating conjunction (e.g., SCONJ, etc.) or and adposition (e.g., ADP, etc.) then the line may be broken after the sentence with an indentation of a constituent rule, if the KeyPhrase count=2 the line may be broken at the next token. The process 400 may continue if an EndOffset variable is less than the Max_Line variable. If the Max_Line variable is reached: if the token is one of the KeyPhrases and the Keyphrase count<2, the token may be written on the line and the line may be broken with the sentence continuation rule and KeyPhrase count variable of the line may be incremented. The length of the token may be divided by 2. If the result (e.g., half of token length) is within Max_Line+3 the token may be continued on the current line otherwise the line may be backtracked and the line may be broken before the token with the sentence continuation rule. Each Keyphrase from the array (e.g., JSON array, etc.) may be highlighted for each sentence. The sentence continuation rule may define that the first line break of the sentence is at BeginOffset=4 and the indentations are on BeginOffset+1 from the line above and subsequent line. The constituent indentation rule may define that a token be lined up with the last of the subordinate conjunction or adposition indentation above. The subsentence indentation rule may define that BeginOffset=3.

In an example, after text is processed and line breaks and indentation for the desired cascaded text format is determined, the required punctuation tagging is added in one or more formats applicable to the desired display application, such as Word®, hypertext markup language (HTML), Kindle®, or others. In an example, for an HTML formatted file, the HTML line break tag <br> is used to break each line of the cascaded text being displayed. In a first indentation example, indentation is achieved by using the following: <p style="margin-left: 40px">This text is indented.</p>. In this first example, the text in the paragraph tag is indented 40 pixels from the left. Any other paragraph tags are not indented. In another example, indentation is achieved by using the following: <p style="text-indent: 40px">This text is indented.</p>. In a second indentation example, only the first line of text in the paragraph is indented 40 pixels from the left. Any additional lines of text in that paragraph are not indented.

In another example, a cascading style sheet (CSS) is used to specify indentation for the processed text. (Note, the term "cascading" in the phrase "cascading style sheet" bears no relation to the use of "cascaded text format" as used herein). In an example, the CSS is placed between the <head></head> HTML tags in an HTML document. The following example: creates a style class named "tab" that indents the text and paragraph 40 pixels from the left.
<style type="text/css">
<!--
.tab { margin-left: 40px;}
-->
</style>

Once the code above is in the <head> section, it is used by adding it to paragraph (<p>) tags as shown: <p class="tab">Example of a tab</p> Alternatively or additionally, in another example, CSS code is placed in a separate file, with the extension .css. This file is linked to from the HTML document and that document may use those CSS properties. Using an external CSS file allows the CSS to be modified independently of the HTML document. for example, the external CSS file is linked to the HTML document by adding the following line in the HTML document in the <head> element (after the <head> tag, and before the </head> tag). Accordingly, desired indents may be inserted using the <p class="tab"> example.

In another example, indenting may be a proportional rather than static. For example, instead of indenting by 40 px (pixels), the indent is replaced with a percentage, for example 5%, to indent text by 5% of the maximum line value. In another example, a left indent is changed to a right indent by changing margin-left to margin-right.

In yet another example, indentation and line breaks are formatted using XML tags and values. For example, Microsoft® Word® may include in the XML code of a document:
<w:pPr>
<w:ind wleft="1440" w:right="1440"/>
</w:pPr>

In the example, the wind tag combined with w:left and w:right tags make be define the left and right indentation. In the example, the w:left value of 1440 may indicate the text should be indented one inch from the left and the w:right value of 1440 may indicate the text should be indented one inch from the right.

In another example, XML tags may be used to indicate line breaks. For example, Microsoft® Word® may include in the XML code of a document:
<w:r><w:t>This is another</w:t></w:r><w:r><w:br/><w:t xml:space="preserve"> simple sentence.</w:t></w:r>. In the example, the tag <w:br/> is used to indicate a line break (e.g., carriage return, etc.) resulting in "simple sentence" being output on a new line after "This is another."

Figure 23:
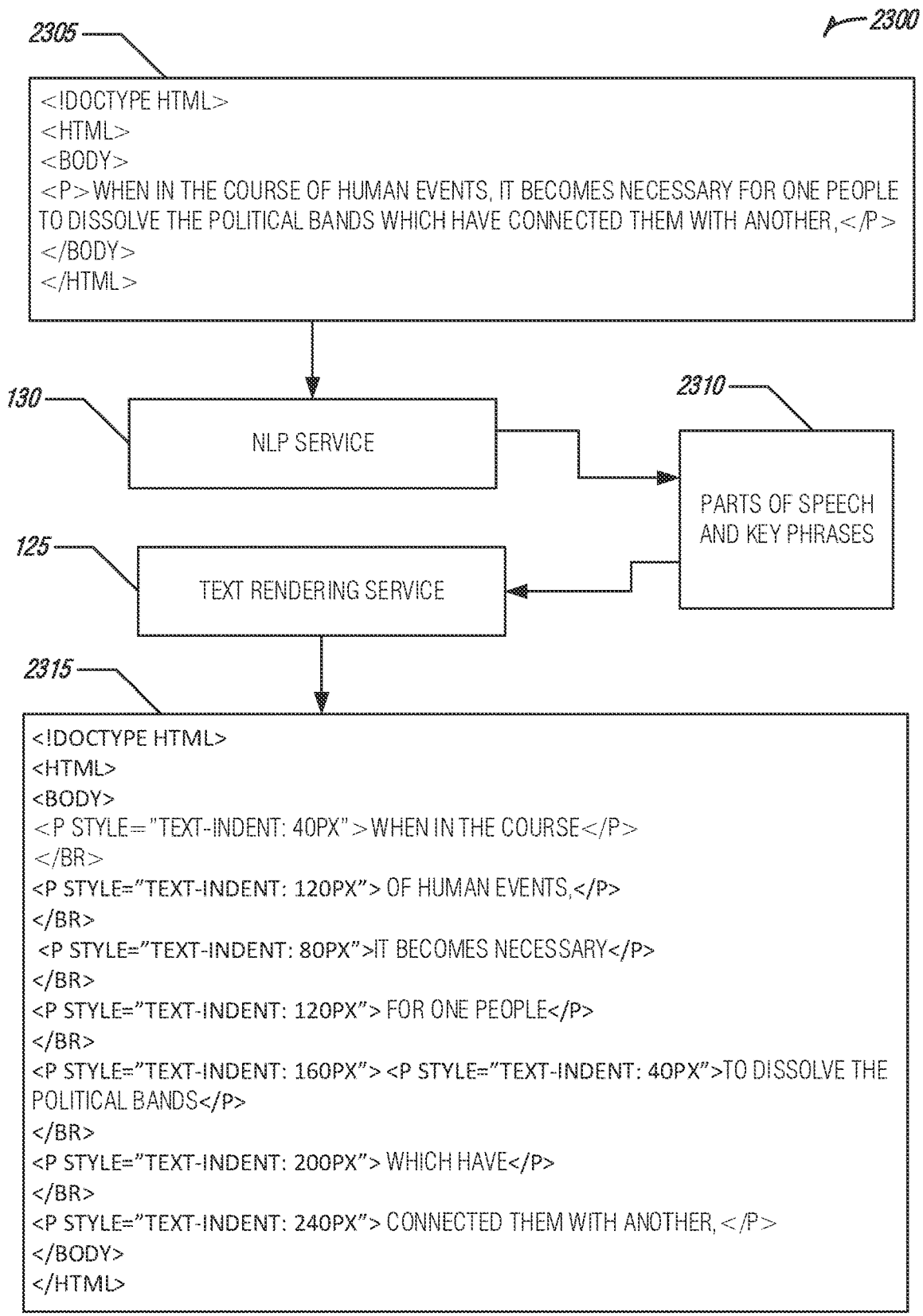
FIG. 23 illustrates an example of a hypertext markup language (HTML) code tagged for cascaded human-readable text using natural language processing, in accordance with one embodiment.

FIG. 23 illustrates an example 2300 of a hypertext markup language (HTML) code tagged for cascaded human-readable text using natural language processing, in accordance with one embodiment. Source text 2305 may be processed by the NLP service 130 as described in FIG. 1 to identify part-of-speech and key phrases 2310. While the example shows the source text 2305 as HTML code, the text may be in ASCII format, XML format, or a variety of other machine-readable formats. The text rendering service 125 as described in FIG. 1 may render tagged output text 2315 that indicates line breaks (e.g., as </br> tags in HTML code, etc.) and indentation (e.g., using the text-indent: tag in HTML, etc.) inserted into the text based on the part-of-speech and key phrases.

Returning to the description of FIG. 1, the machine learning service 135 may work in conjunction with the NLP service 130 to create tagged digital text that defines the part-of-speech and key phrases in a sentence and may work in conjunction with the machine learning service 135 to use probabilistic methods including neural networks (e.g., recurrent neural networks (RNN), etc.) to generate rules for tagging the part-of-speech and key phrases and to generate cascading rules for the part-of-speech and key phrases. The machine learning service 135 may use a variety of machine learning algorithms (e.g., neural networks, classifiers, deep learning, etc.) and metrics as inputs to modify the cascade formatting rules and algorithms.

In an example, ML-based algorithms and systems used herein are neural networks that may employ deep learning algorithms. A neural network, like the human brain, includes a set of interconnected neurons. Deep learning takes data structures modeled on the human brain and trains the neurons using large data sets. The algorithms help the computer learn based on the data provided. Neural networks have become increasingly accurate and may learn more effectively and faster than the human brain. Neural networks are a subset of artificial intelligence that includes machine learning (e.g., decision trees, logistic regression, association mining, support vector machines, neural networks, etc.), search & optimization, logical reasoning, constraint satisfaction, probabilistic reasoning, control theory, etc. that mimics human intelligence.

The NLP service 130 may use a pretrained AI model (e.g., AMAZON® Comprehend, etc.) that may use an RNN for text analysis. Given larger amounts of data, the RNN is able to learn a mapping from input free text to create output such as predicted entities, key phrases, parts of speech, etc. that may be present in the free text. For example, AMAZON® Comprehend is a pretrained model that consumers directly apply to their own text and is trained on large amounts of training data. Initially, many examples of pairings (e.g., input-output pairs) are provided to the model to learn. After going through several examples of input and desired output, the model learns a mapping from input to output. At this point, the model is prepared to make predictions on new text and is ready to be deployed as a service. According to one example embodiment, parts-of-speech modeling is achieved by training a recurrent neural network (RNN). In an example, a RNN includes a system of interconnected processing units called neurons with edges that connect them. The RNN is trained by receiving a series of paired inputs (text) and outputs (parts of speech) that the model needs to learn. The nodes progressively perform complex calculations to learn a mathematical model that maps the association between the text and parts of speech.

In an example, the NLP service 130 may use a ML model that is not pre-trained but is trained for the specific purpose of providing parts of speech, key phrases, and entities as discussed herein. For example, the NLP service 130 may train a neural network using text-part-of-speech, text-key-phrase, and text-entity pairs to allow the neural network to learn to tag parts of speech, key phrases, and entities as output. In an example, additional machine learning models may be trained using key-phrase-format-rule, part-of-speech-format-rule, entity-format-rule pairs to identify cascade formatting rules for the various parts of speech, key phrases, and entities. In another example, user preference and parts of speech, key phrase, and entity pairs may be used to train a machine learning model to identify user preferences based on various parts of speech, key phrases, and entities. The various machine learning models may provide output based on a statistical likelihood that a given input is related to a selected output. Various threshold layers may be present in the models to filter outputs to increase the accuracy of output selection.

Thus, as described above in certain example embodiments, cascading may be determined using a combination of a line-length parameter, and the presence of punctuation, prepositions, and subordinate conjunctions. Text is printed in sequence, as determined by this cascading algorithm, with attention to noun phrases as "Key Phrases" and/or "Entities". According to this embodiment, the process assists in keeping the formatting rules from separating noun phrase constituents.

Figure 22:
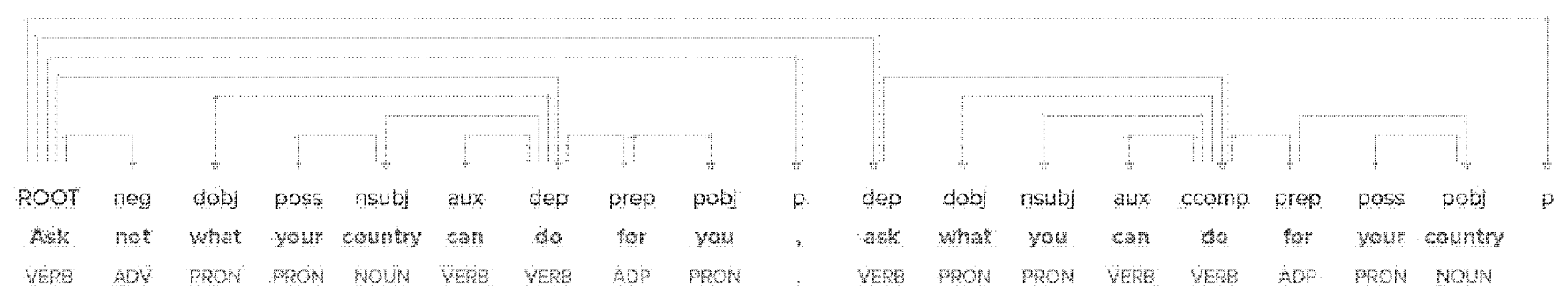

The identification of parts of speech, key phrases and entities aims to prevent cascading from separating noun phrase constituents when applying the cascading formatting rules. Information that may be used to cue reader comprehension may be lost by improper and/or insufficient representation of constituent structure. Accordingly, according to another example embodiment, a grammar-based parsing algorithm is used (e.g., Stanford Parser (https://nlp.stanford.edu/software/lex-parser.shtml), etc.) that can produce output that preserves linguistic dependencies. The Stanford Parser is a probabilistic parser that uses knowledge of language gained from hand-parsed sentences to try to produce the most likely analysis of new sentences. In this embodiment, a parse tree (e.g., a dependency tree as shown in FIG. 22, etc.) serves as input to a cascading algorithm that may use actual constituent relationships to determine line breaks for text. For example, the sentence "The strongest rain ever recorded in India shut down the financial hub of Mumbai, snapped communication lines, closed airports and forced thousands of people to sleep in their offices or walk home during the night, officials said today." is parsed as shown in Table 2.

TABLE 2

```
(ROOT
  (S
    (S
      (NP
        (NP (DT The) (JJS strongest) (NN rain))
        (VP
          (ADVP (RB ever))
          (VBN recorded)
          (PP (IN in)
            (NP (NNP India)))))
      (VP
        (VP (VBD shut)
          (PRT (RP down))
          (NP
            (NP (DT the) (JJ financial) (NN hub))
            (PP (IN of)
              (NP (NNP Mumbai)))))
```

TABLE 2-continued

```
        (, ,)
        (VP (VBD snapped)
          (NP (NN communication) (NNS lines)))
        (, ,)
        (VP (VBD closed)
          (NP (NNS airports)))
        (CC and)
        (VP (VBD forced)
          (NP
            (NP (NNS thousands))
            (PP (IN of)
              (NP (NNS people))))
          (S
            (VP (TO to)
              (VP
                (VP (VB sleep)
                  (PP (IN in)
                    (NP (PRP$ their) (NNS offices))))
                (CC or)
                (VP (VB walk)
                  (NP (NN home))
                  (PP (IN during)
                    (NP (DT the) (NN night)))))))))))
      (, ,)
      (NP (NNS officials))
      (VP (VBD said)
        (NP-TMP (NN today)))
      (. .)))
```

According to this embodiment, grammar-based parsing provides an ability to preserve the dependencies within the language that identification of constituents spacing may not. The dependencies identified by the grammar-based parser may help readers to understand referential, causal, and inferential relationships within clauses.

According to an example embodiment, the tagged text is used to develop the text cascade by applying rules to part-of-speech rather than using specific words as cascade triggers. For example, rather than developing a table of specific prepositions (e.g., of, in, etc.), the part-of-speech and/or key phrases as defined by the NLP service 130 in the rule process are used so that sentence breaks and cascading, that includes indentations, are defined by the rules provided and applied against the output of the NLP service 130.

The text rendering service 125 may make several calls to the NLP service 130 for multiple functions, including: identifying part-of-speech, identifying key phrases, identifying entities (e.g., people, places, things, etc.) that may be included in a sentence. Each of these is a separate call/function which, when combined, provide the set of tags to be used for to generate cascaded text. In English grammar, a constituent of a sentence is a linguistics part of the larger sentence, phrases, or a clause. For example, all words, phrases, and clauses that make up a sentence are constituents. Sentences are represented as a hierarchy. For example, an English sentence "The cat chased a mouse" may have a sentence constituent hierarchy as shown in Table 3.

TABLE 3

| Noun Phrase | | Verb Phrase | | |
| --- | --- | --- | --- | --- |
| | | | Noun Phrase | |
| Article | Noun | Verb | Article | Noun |
| The | cat | chased | a | mouse |

Eye fixation is a point where the eye takes a rest during the reading process. Optimal eye movement is a number of characters captured by two eye fixations and spaces. Linguistic structure refers to the grammar, syntax, semantics, morphology, phonology, etc. of a sentence or text passage. Syntax is a branch of linguistic study that focuses on the structure of a sentence using part-of-speech. Part-of-speech tagging is a task of NLP processing that tags grammatical part-of-speech. An offset as used herein refers to and anchor point to determine where to start counting characters including spaces. A cursor position is referred as a current offset. Begin Offset refers to start, End Offset is end of the word or space.

According to one example embodiment, key phrases are determined in a probabilistic manner by the NLP service 130 using computational linguistics. The identified key phrases are most likely to convey key contents of the sentence relevant for comprehension.

The cascading text generated by the text rendering service 125 may improve reading comprehension. According to an example embodiment, information encoded in who, when, where, and what clauses, and noun phrases that represent these clauses, are used as a signifier or guide to determine line breaks and/or indentation to achieve a cascaded text format. Optimal Eye movement is considered for line breaks. The linguistic structure defines cascading instead of rules that interpret the language structure. The text rendering service 125 uses key phrases to determine who, when, where, and what of a sentence. This may be contrasted with a verb focused algorithm. Rather than processing thousands of rules to evaluate text, the NLP service 130 uses part-of-speech tagging. Indentations inserted by the text rendering service 125 is based on sentence constituency hierarchy informed by part-of-speech tags. A configurable maximum line length is set guided by eye fixation and dependent upon the indentation rules.

In an example, an English language sentence may be provided as input to the NLP processing service 130. An English sentence consists of Subject, Verb, and Object. The sentence is defined as a sequence of words ending with a period with subject verb and object. The maximum length of a line is configurable, but it is guided by two eye fixations. For example, the maximum length may be set to 35 characters. The NLP service 130 may perform entity recognition, key phrase identification, and part-of-speech (POS) identification. The text rendering service 125 may process text corresponding to entities, key phrases, and part-of-speech using formatting rules that may be selected based on type, individually designated rules, categories, etc. The indentation and line breaks inserted by the text rendering service 125 are based on the POS identification and linguistic rules of sentence constituency.

For each sentence, the text rendering service 125 may:
Get Part-of-speech tags, Key Phrases, and Entities from the NLP service 130.
   Start the sentence at position 1 in on the text editor.
   Write one word at a time on a line until the maximum line length.
   Break the line if a ",", or a ")" is encountered as one of the punctuations. Start the new line by adding 2 characters to the position where the line above started. In an example, the line may not be broken when punctuation is encountered and may proceed with further evaluation of the linguistic structure of the sentence.
OR
Break the line if the word is the head of a prepositional phrase because it establishes the scope of the text that will follow. Start the head of a prepositional phrase at a position of the last head of the prepositional phrase.
   If it is the first head of the prepositional phrase, then record it as the first position of the head of the prepositional phrase, indent it 2 more positions than the line above.
OR
Break the line if the word is subordinating conjunction because it links parts of the sentence together. Indent the next word at the last indentation of the subordinating conjunction. If it is the first subordinating conjunction, then record it as the first position for subordinating conjunction, indent it two more than the line above.
OR
Break the line if punctuation is encountered at the end of the word is ":", or ";" or "?" or "!" and indent at the position of "3" that is left justified.

The text rendering service 125 may limit one key phrase on a line before cascading. Therefore, a key phrase count is kept as words are encountered. The text rendering service 125 does not break a line in the middle of a key phrase. If the maximum line limit is reached while processing a token, then break if more than half of the word is past the maximum limit. For example, if the maximum line length is reached while processing the work enchantment. The maximum line is reached while processing the character 'c'. The word is 11 characters long and the character 'c' is found at position 3 in the word. Therefore 1½ is approximately 5 which is greater than 3, so break the line before enchantment.

Continuous improvement of text tagging and cascade rules may be achieved by employing artificial intelligence including machine learning techniques via the machine learning service 135. The inputs/outputs to and from the machine learning service 135 may be processed actively and passively. For example, the machine learning service 135 may operate under an active machine learning approach in an example where for two users may be reading the same material with a slightly different cascade format between person A and B. The reading comprehension by the users of the material may be tracked via assessments and the machine learning service 135 may generate outputs that may be used by the text rendering service 125 to modify the cascade rules over time. This allows the for better at scale with usage. The machine learning service 135 may operate in a passive mode to measure attributes like reading comprehension without an explicit assessment. For example, the machine learning service 135 may collect data that (singly and when combined) may be used to generate output indicative of reader comprehension without the user taking an assessment. Some of the data that may be evaluated to refine machine learning models may be, by way of example and not limitation, time spent reading a given portion of text (e.g., less time spent reading may indicate higher comprehension, etc.), eye tracking using cameras (e.g., embedded cameras, external, etc.) that evaluate efficiency of eye movement across different cascades formats of the same content to provide machine learning input, and user modification may evaluate the degree of personal modification for user preferences (e.g., more spacing, sentence fragment length, font, color enhancement of key phrases or part-of-speech, etc.).

The analytics service 140 may log and store user analytics including measures of reading comprehension, user preferences as reflected in modifications to the system (e.g., scrolling speed, spacing, fragment length, dark mode, key phrase highlighting, etc.), etc. The modifications may be evaluated for various cascade formats to determine how various modifications translate into comprehension and may be fed into the machine learning service 135 as input to improve default cascade formats. The user profile service 145 may store user profile data including an anonymized identifier for privacy and privacy compliance (e.g., HIPPA compliance, etc.), and may track performance metrics and progress. For example, personalizations that are continually made by the user may be learned by and the machine learning service 135 based on input from the analytics service 140 and may be used to generate user-specific cascade rules. The access control service 150 may provide access to stored content including metrics on frequency, time of use, attributes (e.g., fiction, non-fiction, author, research, poetry, etc.). According to another personalization, a user may personalize display parameters such text color, font, font size, and other display parameters.

In an example, a reading score may be developed for a user. A scoring matrix may be created that may be based on a student's age and grade that may be a result of their reading of specified content and then their associated comprehension (e.g., a Reading Comprehension Score (RCS), etc.). The metric may be based on evaluation of consumption of text by the user using cascade formatting. For example, an assessment may be tracked over time—actively or passively—to determine speed and efficiency of the comprehension of the text by the user. A quotient may be calculated for the user that increases with speed of comprehension. Inputs received before performing a reading assessment may be used to generate a baseline quotient for the user A cognitive training library may be developed using cascade formatting. For example, various published content items such as books, magazines and papers may be translated using the cascading format and users may be allowed to access the library for purposes of training their brains to increase comprehension and retention. Tests and quizzes may be used to assess performance of comprehension of the user to provide the user with tangible evidence of cognitive improvement.

Cascade formatting may be applied to process a variety of languages. An NLP parser(s) may be used to tag other language text and rules may be created and applied to the NLP output (e.g., Spanish text, etc.) to cascade foreign language text accordingly. In addition to language adaptations, adaptations may be made based on syntax of other languages and thus the cascaded text for a different language may cascade in a different format using different formatting rules to account for localized syntax variations. This allows for a high rate of language detection (e.g., 100+ languages) and numerous variations to adapt the cascaded text to the language and syntax.

In an example, spoken word may be combine with visual display of the cascade formatted text. Sound may be integrated such that as one is reading cascading text there is also spoken word reading the same text and at a controllable speed to match the individual reader's speed. For example, text-to-speech may be used to provide the audio/speech output in real time and reading pace and comprehension may be evaluated and speed of the text-to-speech output may be altered (e.g., sped up, slowed down, paused, resumed, etc.) to keep the audio synchronized with the reading of the user.

Figure 5:
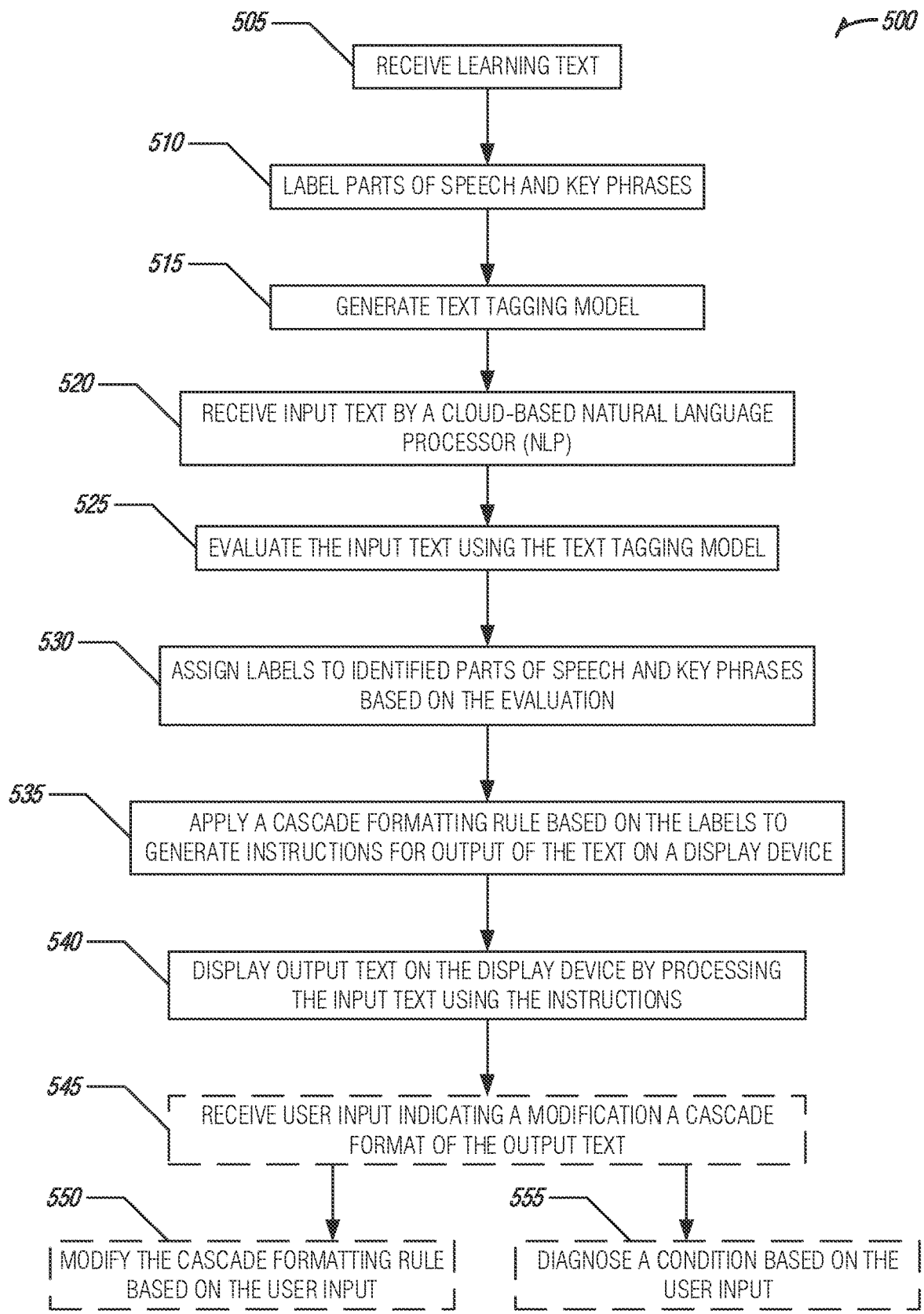
FIG. 5 illustrates a process for training and using a machine learning model for generating a cascade format for human-readable text, in accordance with one embodiment.

FIG. 5 illustrates a process 500 for training and using a machine learning model for generating a cascade format for human-readable text, in accordance with one embodiment. The process 500 may provide features as described in FIGS. 1 through 4.

At operation 505, a corpus of learning text may be received the learning text may include a variety text that may include a variety of formatted text and labeled and unlabeled key phrases and part-of-speech.

At operation 510, any unlabeled part-of-speech and key phrases may be labeled by a machine learning processor (e.g., the machine learning service 135 as described in FIG. 1, etc.). At operation 515, the output of the machine learning processor may be used to generate a text tagging model that may be used by the machine learning processor to label future unlabeled inputs. In an example, the machine learning processor may evaluate the formatting of the learning text to generate a cascade format model the includes learned indentation and line breaking rules identified in the evaluation.

At operation 520, input text may be received by a cloud-based NLP (e.g., the NLP service 130 as described in FIG. 1, etc.). At operation 525, the input text may be evaluated by the text tagging model. At operation 530, labels may be assigned to identified part-of-speech and key phrases based on the evaluation. At operation 535, a cascade formatting rule may be applied based on the labels to generate instructions for output of the text on a display device. In an example, the cascade formatting rule may be selected using the cascade format model. At operation 540, output text may be displayed on the display device by processing the input text using the instructions.

In an example, at operation 545, user input may be received that indicates a modification to a cascade format of the output text. The cascade formatting rule may be modified based on the user input at operation 550. A condition may be diagnosed based on the user input at operation 555.

Figure 6:
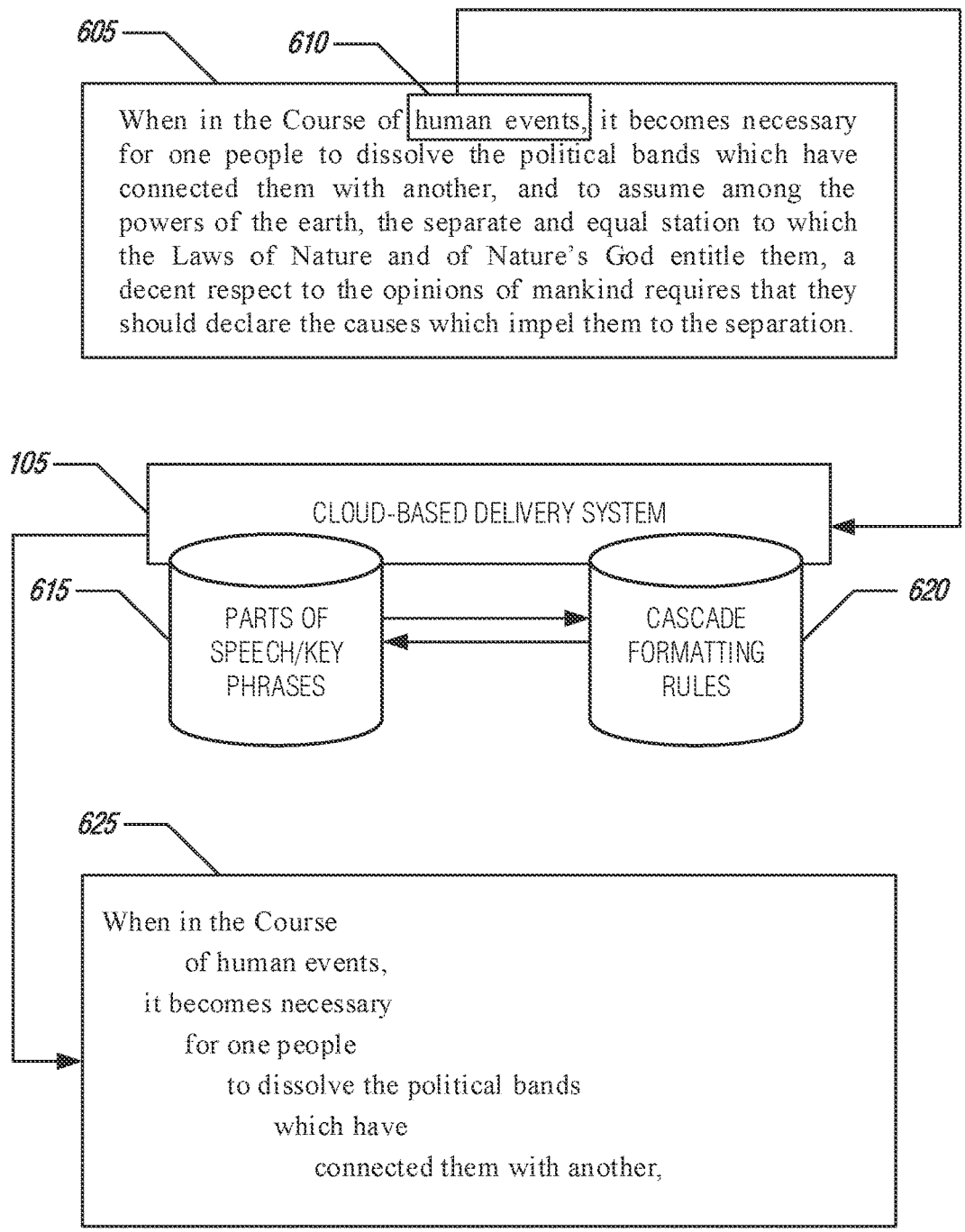
FIG. 6 illustrates an example of generating cascaded human-readable text using natural language processing, in accordance with one embodiment.

FIG. 6 illustrates an example 600 of generating cascaded human-readable text using natural language processing, in accordance with one embodiment. The example 600 may provide features as described in FIGS. 1 through 5. Input text 605 may be received. The received text may be received from a webpage, a document, a content publisher, a text editor, and the like. part-of-speech and key phrases 610 may be identified in the input text 605 by an NLP parser based on predefined part-of-speech and key phrase data 615. In an example, a machine learning processor may identify unknown key phrases by processing the input text 605 to classify words or combinations of words as a key phrase. The input text 605 including the part-of-speech and key phrases 610 may be received by the system 105.

The identified part-of-speech and key phrases 610 may be evaluated against a set of cascade formatting rules 620. The set of cascade formatting rules 620 may include rules for inserting line breaks, indentation, and other formatting elements into the input text 605 to generate output text 625. The cascade formatting rules may be specific to a key word or part-of-speech or may be defined for a class or type of part-of-speech or key phrase. For example, a rule may exist for an adposition, a subject, proper nouns, book titles, etc. For example, "human events" may be a key phrase and a cascade formatting rule corresponding to a key phrase type to which "human events" belongs may include instructions to insert a line break and indentation from the last line before the instance of "human events."

The input text 605 may be converted and displayed as the output text 625 by inserting the appropriate formatting. The resultant display provides a cascaded text display incorporating each of the relevant cascade formatting rules corresponding to the part-of-speech and key phrases 610.

Figure 7:
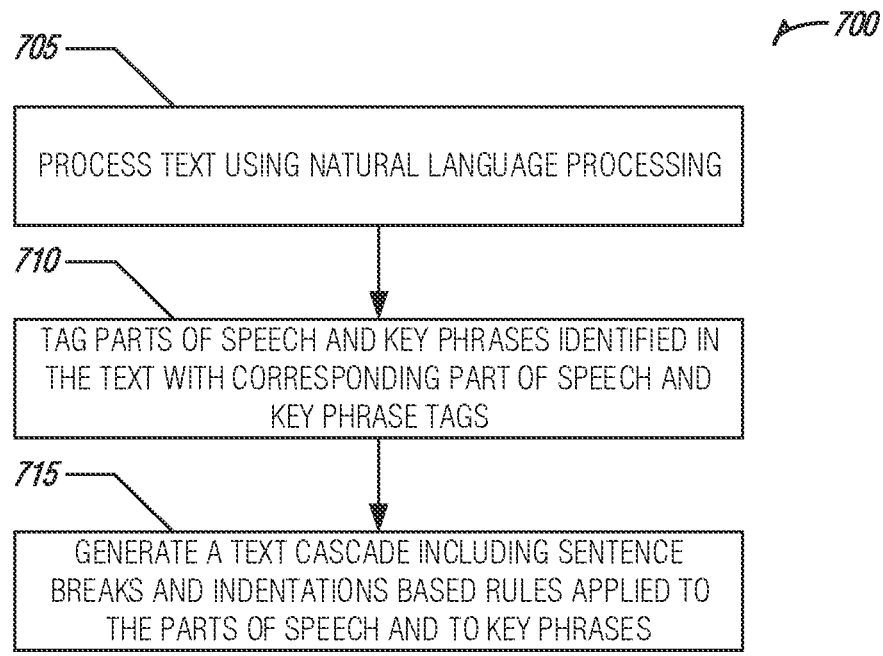
FIG. 7 illustrates a method for generating cascaded human-readable text using natural language processing, in accordance with one embodiment.

FIG. 7 illustrates a method 700 for generating cascaded human-readable text using natural language processing, in accordance with one embodiment. The method 700 may provide feature as described in FIGS. 1 through 5. At operation 705, text may be processed using natural language processing (NLP) parser (e.g., by the NLP service 130 as described in FIG. 1, etc.). In an example, the NLP parser may be a neural network. In an example, the NLP parser uses probabilistic analysis to parse a sentence in the text. At operation 710, part-of-speech and key phrases identified in the text may be tagged with corresponding part-of-speech and key phrase tags. At operation 715, a text cascade may generated that includes sentence breaks and indentations based on rules applied to the part-of-speech and key phrases. In an example, the text cascade may be displayed on a display device. In an example, the display device is selected from the group: desktop computers, laptops, e-readers, tablet computers, watches, TV's, car screens, smartphones, graphical displays, user-worn visual display devices. In an example, the user-worn visual display devices include devices selected from the group: AV headsets, VR headsets, glasses, and contact lenses.

Figure 8:
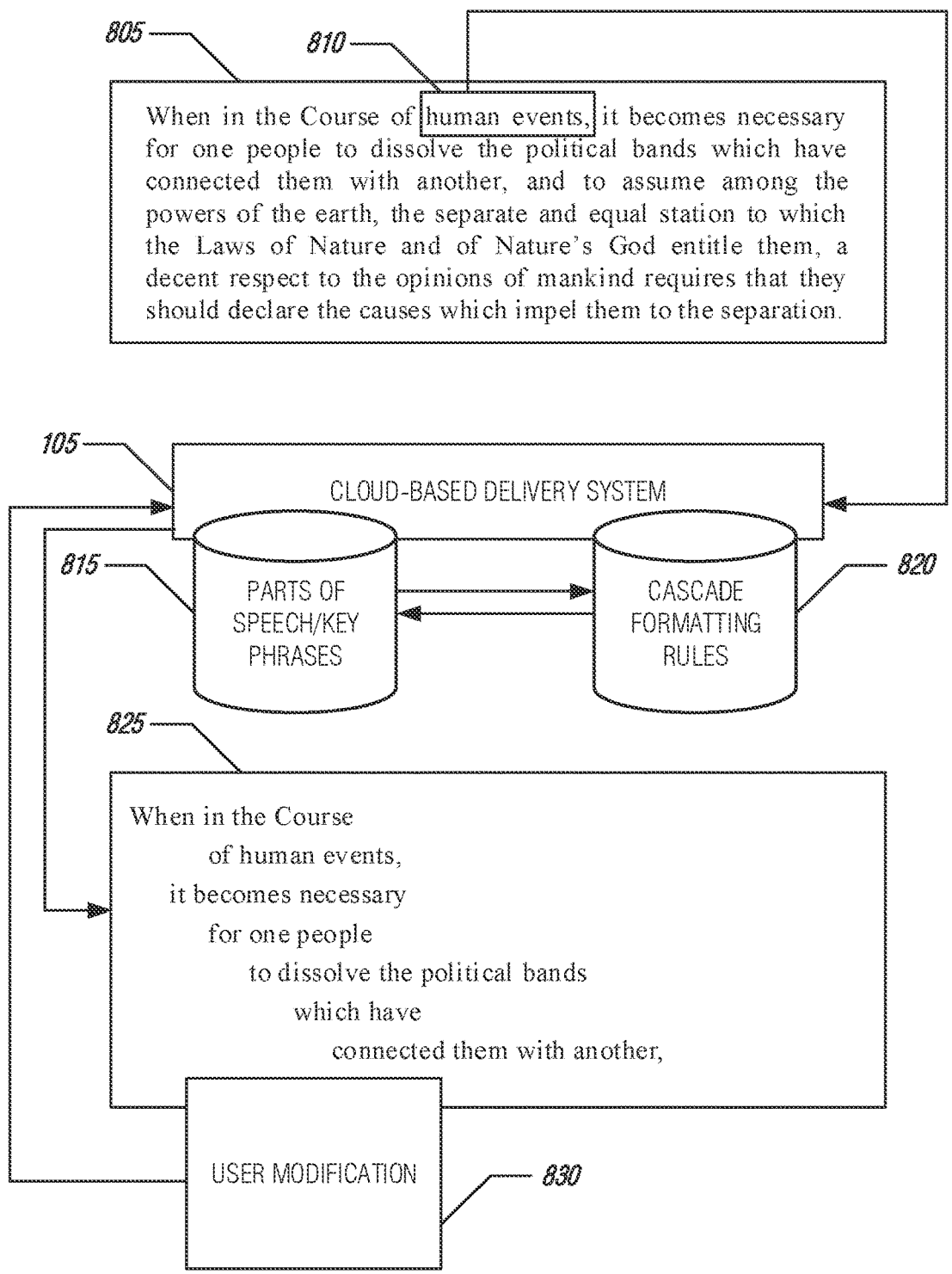
FIG. 8 illustrates an example of adapting cascaded human-readable text using natural language processing based on feedback input, in accordance with one embodiment.

FIG. 8 illustrates an example 800 of adapting cascaded human-readable text using natural language processing based on feedback input, in accordance with one embodiment. The example 800 may provide features as described in FIGS. 1 through 5. As described with respect to FIG. 6, input text 805 may be received, and part-of-speech and key phrases 810 may be identified in the input text 805 by an NLP parser based on predefined part-of-speech and key phrase data 815. The identified part-of-speech and key phrases 810 may be evaluated against a set of cascade formatting rules 820. The set of cascade formatting rules 820 may include rules for inserting line breaks, indentation, and other formatting elements into the input text 805 to generate output text 825. Also as described with respect to FIG. 6, the input text 805 may be converted and displayed as the output text 825 by inserting the appropriate formatting. The resultant display provides a cascaded text display incorporating each of the relevant cascade formatting rules corresponding to the part-of-speech and key phrases 810. Users may have particular preferences for how text is displayed, and modifications made by a user may be detected and may be used to modify the cascade formatting rules 820. A user may make a user modification 830 to the output text 825. The user modification 830 may directly modify the cascade formatting rules based on the user modification 830 effecting display of a particular part-of-speech or key phrase 810. The user modification 830 may be used as input to a machine learning processor that may track user modifications over time including the user modification 830 to learn to adapt the cascade formatting rules over time. For example, a set of user customized cascade formatting rules may be maintained, and the set of user customized cascade formatting rules may be applied after application of the cascade formatting rules 820 to adapt the output text 825 for the user.

Figure 9:
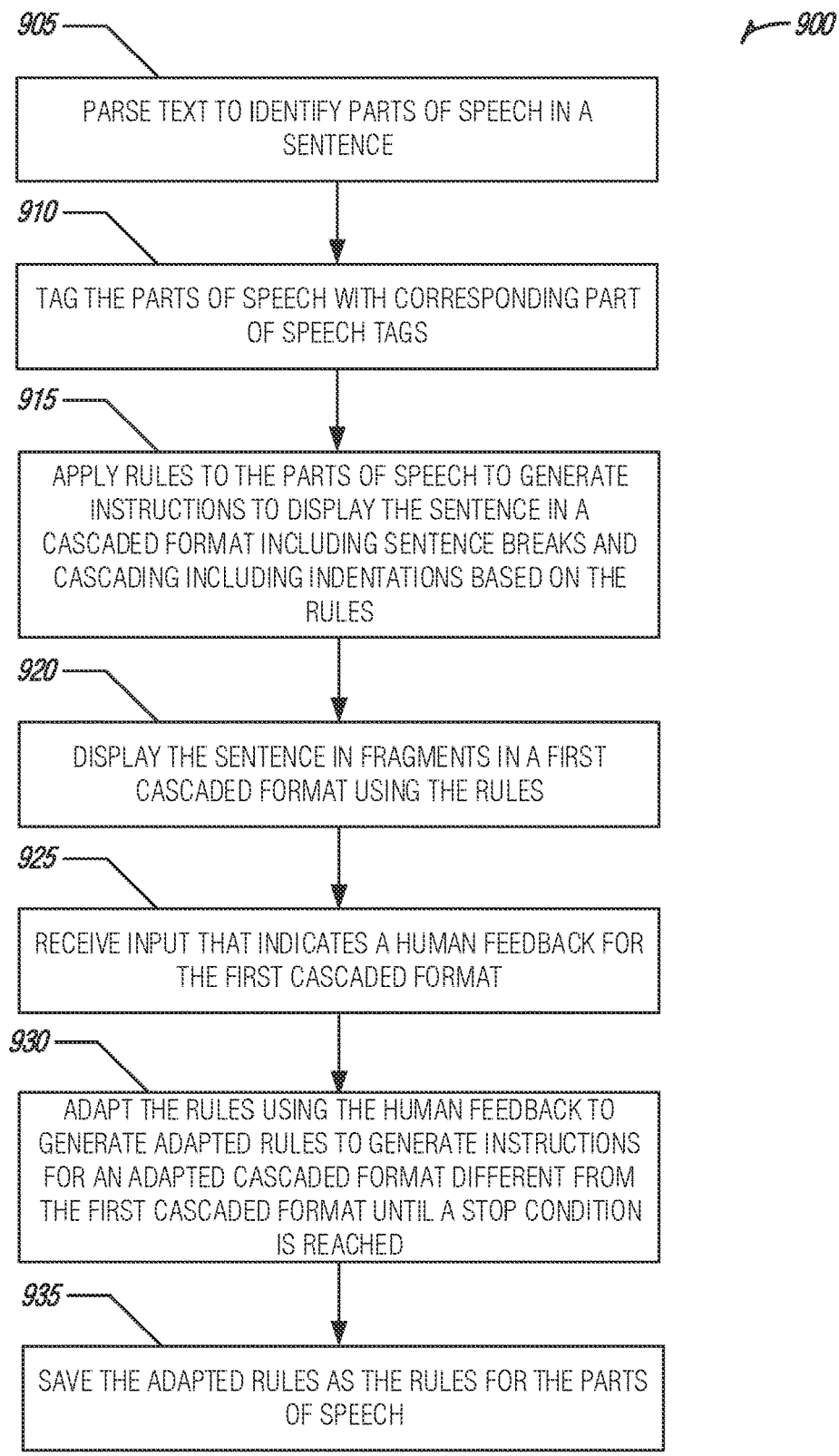
FIG. 9 illustrates a method of adapting cascaded human-readable text using natural language processing based on feedback input, in accordance with one embodiment.

FIG. 9 illustrates a method 900 for adapting cascaded human-readable text using natural language processing based on feedback input, in accordance with one embodiment. The method 900 may provide features as described in FIGS. 1 through 5. At operation 905, text may be parsed to identify part-of-speech in a sentence (e.g., by the NLP service 130 as described in FIG. 1, etc.). At operation 910, the part-of-speech may be tagged with corresponding part-of-speech tags. At operation 915, rules may be applied to the part-of-speech to generate instructions to display the sentence in a cascaded format including sentence breaks and cascading including indentations based on the rules. At operation 920, the sentence may be displayed in fragments in a first cascaded format using the rules. At operation 925, input may be received that indicates a human feedback for the first cascaded format. In an example, the human feedback may be indicative of subjective user preferences and/or the ability of a human to comprehend a sentence displayed using the rules. At operation 930, the rules may be adapted using the human feedback to generate instructions for an adapted cascaded format different from the first cascaded format until a stop condition is reached. At operation 935, the adapted rules may be saved as the rules for the part-of-speech. In an example, the human feedback used to adapt the rules may be based on a single individual, and the rules may be adapted specifically for the single individual and the rules may be provided that are personalized for each one of a plurality of individuals. In an example, the stop criteria may be selected from the set: a number of iterations of adaptation, an input received by a human, or a determination that the adaptations are not improving the readability of the cascaded text. In an example, the human feedback may indicate a change in spacing of sentence fragments, sentence fragment length, or both.

Figure 10:
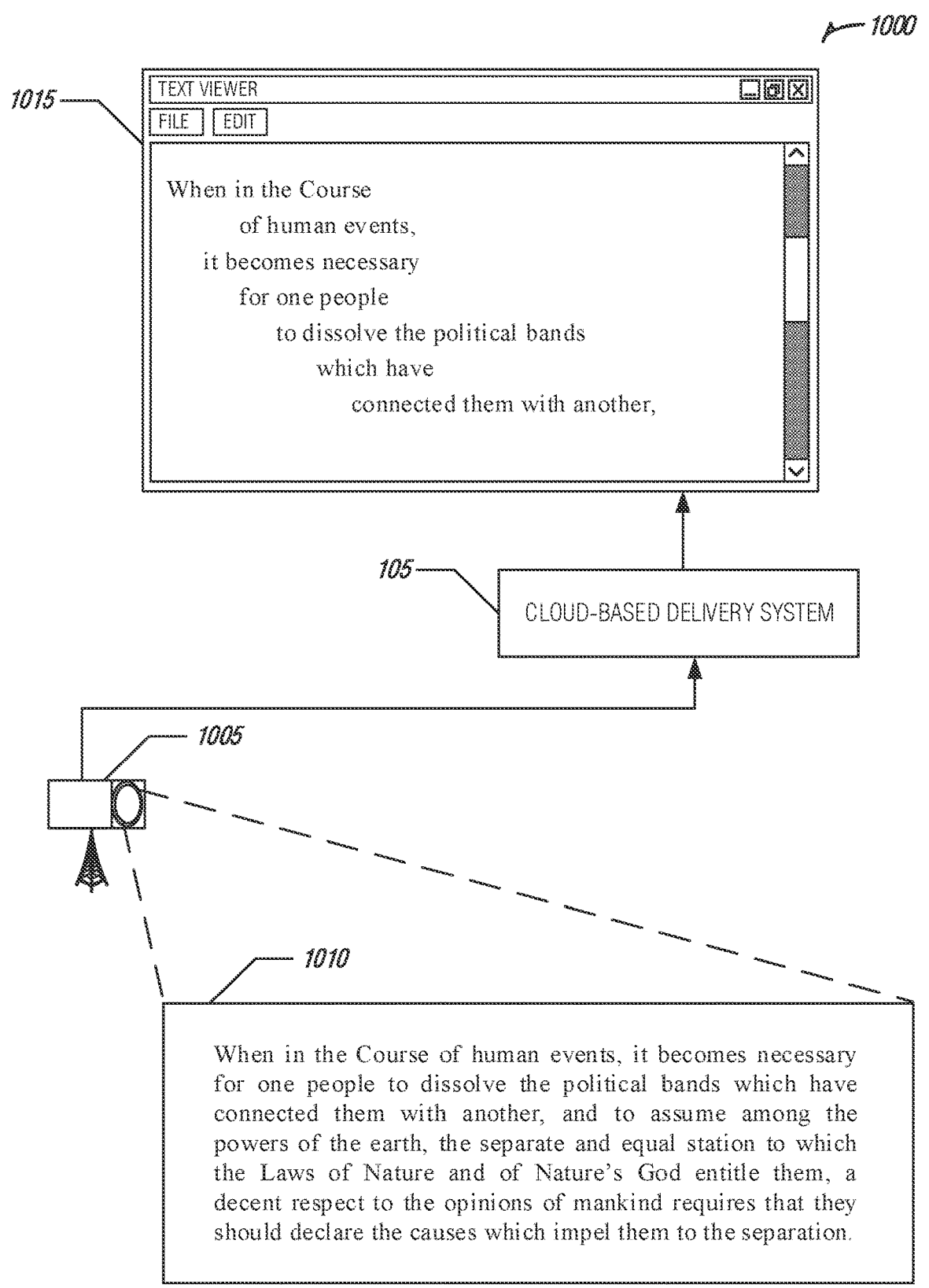
FIG. 10 illustrates an example of generating cascaded human-readable text from a captured image using natural language processing, in accordance with one embodiment.

FIG. 10 illustrates an example 1000 of generating cascaded human-readable text from a captured image using natural language processing, in accordance with one embodiment. The example 1000 may provide features as described in FIGS. 1 through 5. An imaging device 1005 may capture an image including text 1010. The image may be processed (e.g., via optical character recognition, etc.) to extract the text 1010 from the image. The text 1010 may be evaluated via the system 105 to identify part-of-speech and key phrases in the text. Cascade formatting rules may be applied to the text 1010 for the part-of-speech and key phrases identified in the text 1010. The text 1010 may be converted to cascaded output text and displayed for consumption by a user.

Figure 11:
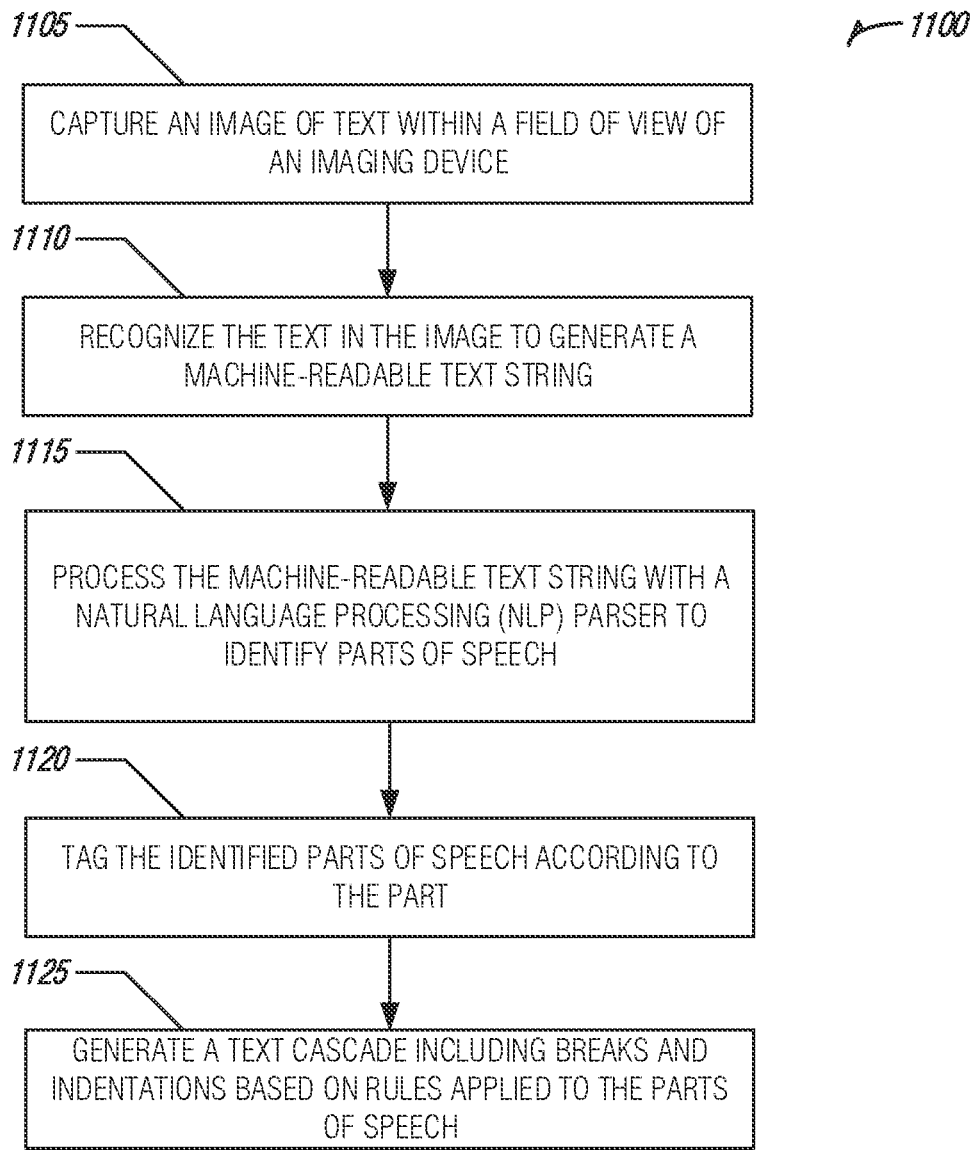
FIG. 11 illustrates a method for generating cascaded human-readable text from a captured image using natural language processing, in accordance with one embodiment.

FIG. 11 illustrates a method 1100 for generating cascaded human-readable text from a captured image using natural language processing, in accordance with one embodiment. The method 1100 may provide features as described in FIGS. 1 through 5. At operation 1105, an image of text may be captured within a field of view of an imaging device. At operation 1110, the text may be recognized in the image to generate a machine-readable text string. At operation 1115, the machine-readable text string may be processed with a natural language processing (NLP) parser to identify part-of-speech. In an example, the NLP parser may include a neural network. In an example, the NLP parser may use probabilistic analysis to parse a sentence within the text. At operation 1120, the identified part-of-speech may be tagged according to the part. At operation 1125, a text cascade may be generated that includes breaks and indentations based on rules applied to the part-of-speech. In an example, the text string may contain sentences of text, and the breaks and indentations may be applied to the sentence.

Figure 12:
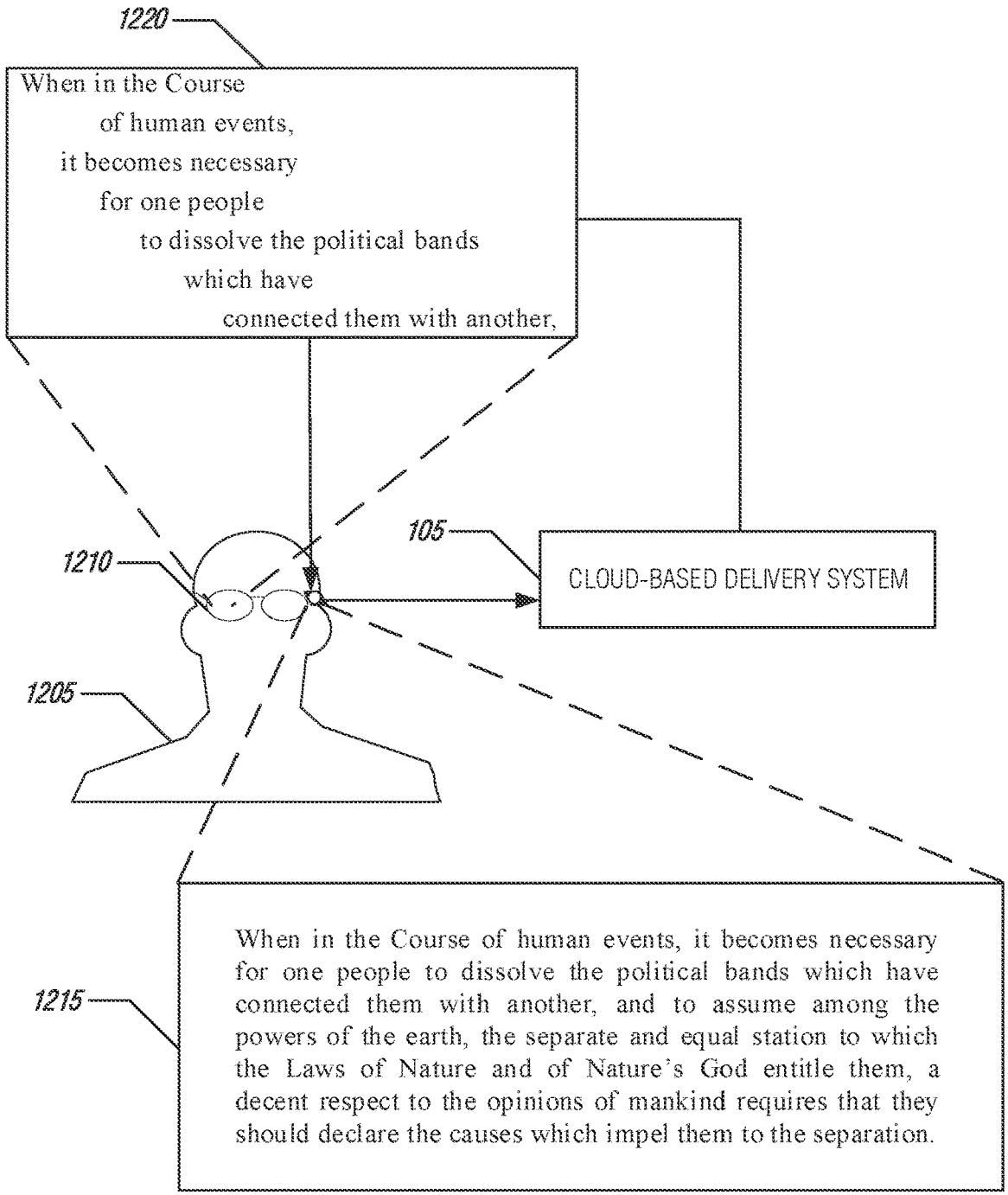
FIG. 12 illustrates an example of converting human-readable text from a first display format to a second display format in an eyewear device using natural language processing, in accordance with one embodiment.

FIG. 12 illustrates an example 1200 of converting human-readable text from a first display format to a second display format in an eyewear device using natural language processing, in accordance with one embodiment. The example 1200 may provide features as described in FIGS. 1 through 5. A user 105 may be wearing smart glasses that include an imaging device 1210. The imaging device 1210 may capture an image including text 1215. The image may be processed (e.g., via optical character recognition, etc.) to extract the text 1215 from the image. The text 1215 may be evaluated via the system 105 to identify part-of-speech and key phrases in the text. Cascade formatting rules may be applied to the text 1215 for the part-of-speech and key phrases identified in the text 1215. The text 1215 may be converted to cascaded output text and displayed on a display device of the smart glasses that include an imaging device 1210 for consumption by a user.

Figure 13:
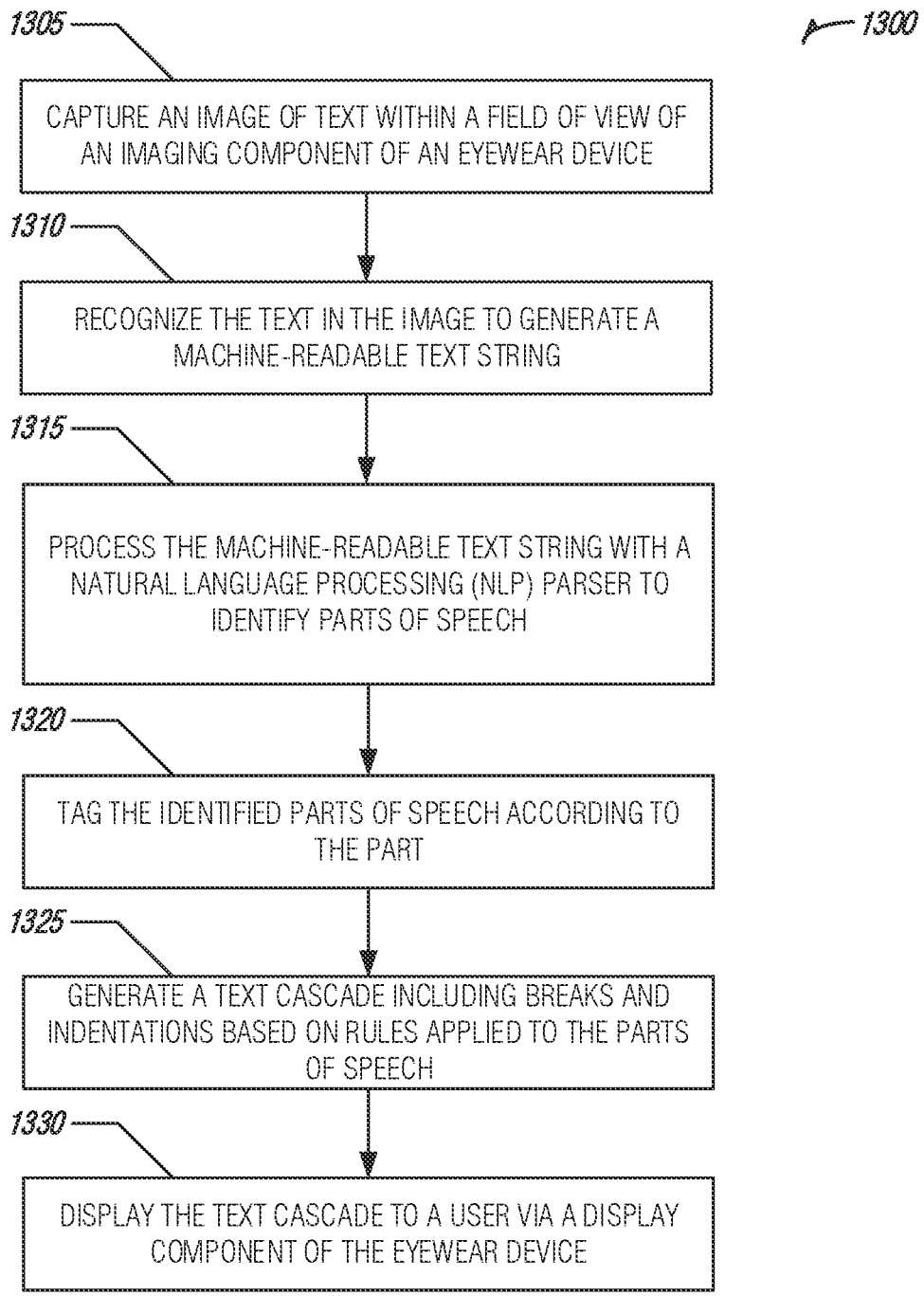
FIG. 13 illustrates a method for converting human-readable text from a first display format to a second display format in an eyewear device using natural language processing, in accordance with one embodiment.

FIG. 13 illustrates a method 1300 for converting human-readable text from a first display format to a second display format in an eyewear device using natural language processing, in accordance with one embodiment. The method 1300 may provide features as described in FIGS. 1 through 5. At operation 1305, an image of text may be captured within a field of view of an imaging component of an eyewear device. At operation 1310, the text may be recognized in the image to generate a machine-readable text string. At operation 1315, the machine-readable text string may be processed with a natural language processing (NLP) parser to identify part-of-speech. In an example, the NLP parser may include a neural network. In an example, the NLP parser may use probabilistic analysis to parse a sentence within the text. At operation 1320, the identified part-of-speech may be tagged according to the part. At operation 1325, a text cascade may be generated that includes breaks and indentations based on rules applied to the part-of-speech. In an example, the text string may contain sentences of text, and the breaks and indentations may be applied to the sentence. At operation 1330, the text cascade may be displayed to a user via a display component of the eyewear device.

Figure 14:
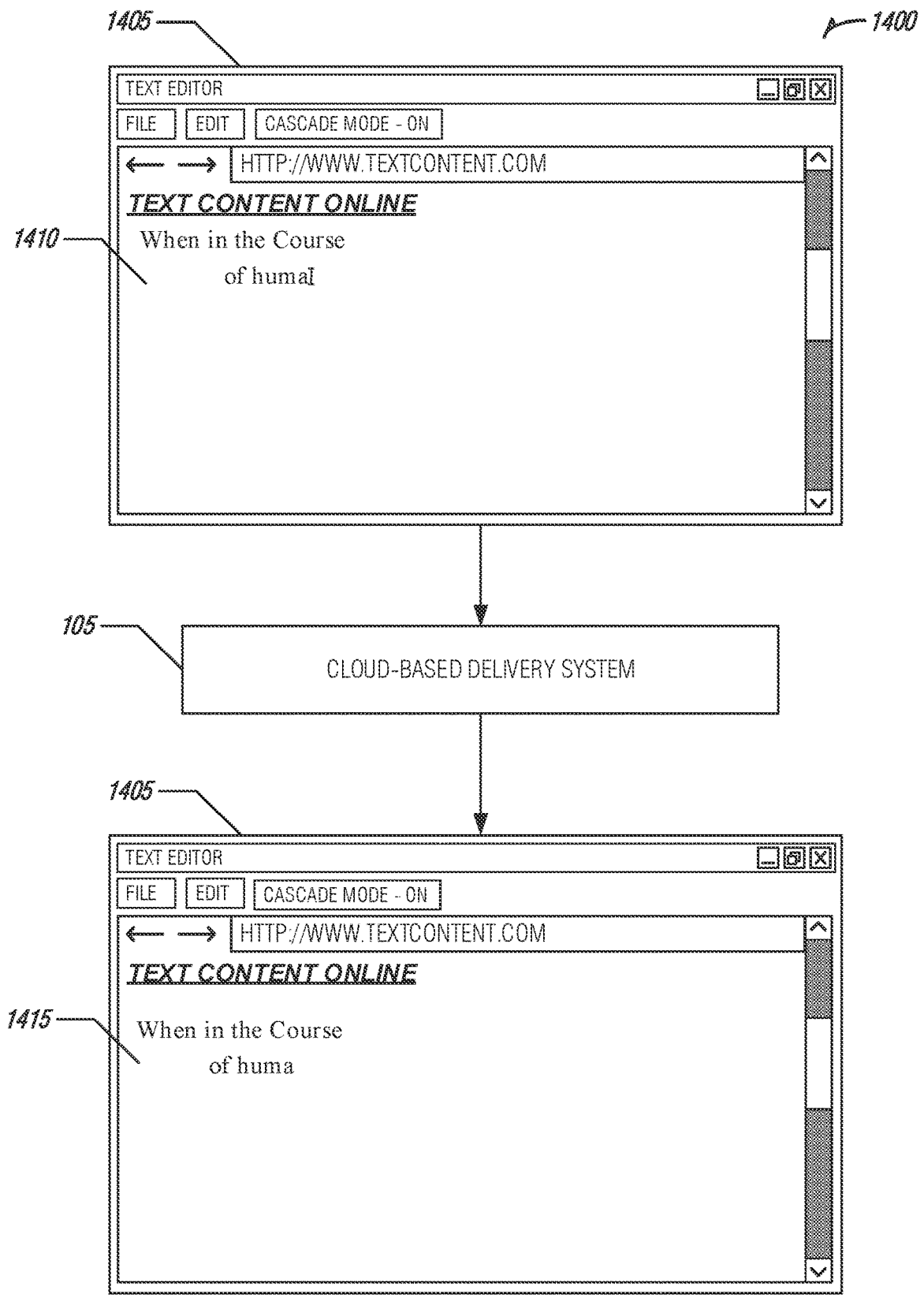
FIG. 14 illustrates an example of generating cascaded human-readable text using natural language processing as text is authored, in accordance with one embodiment.

FIG. 14 illustrates an example 1400 of generating cascaded human-readable text using natural language processing as text is authored, in accordance with one embodiment. The example 1400 may provide features as described in FIGS. 1 through 5. A text authoring tool 1405 may receive text input 1410 from a user (e.g., via a keyboard, voice command, etc.). As the text input 1410 is received, it is processed by the system 105 (via online connection, locally available components, etc.) to identify part-of-speech and key phrases in the text input 1410. Cascade formatting rules may be applied to the text input 1410 for the part-of-speech and key phrases identified in the text input 1410. The displayed output text 1415 may be displayed as cascaded output text as the user enters the text to provide the user with real-time cascade formatting as text is entered.

Figure 15:
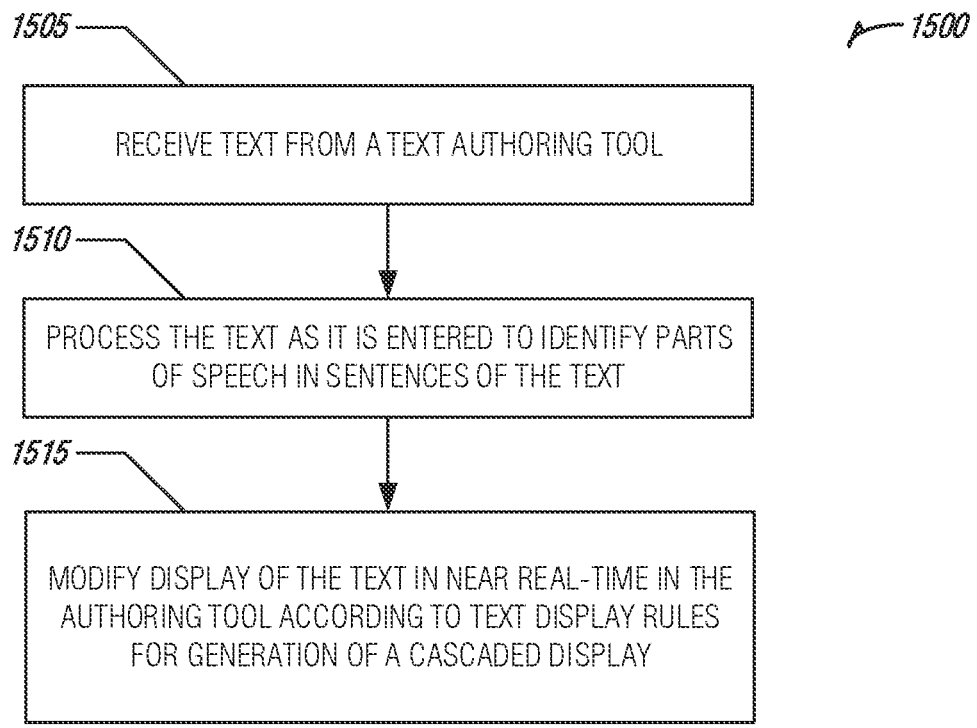
FIG. 15 illustrates a method for generating cascaded human-readable text using natural language processing as text is authored, in accordance with one embodiment.

FIG. 15 illustrates a method 1500 for generating cascaded human-readable text using natural language processing as text is authored, in accordance with one embodiment. The method 1500 may provide features as described in FIGS. 1 through 5. The systems and techniques discussed herein may be used to draft and author in cascaded format. In an example, the user is able to draft and see the text cascade in real time. Like a grammar checker or spell checker, the user is able to create documents using the cascaded format (e.g., rather than drafting in block and then converting, etc.). At operation 1505, text may be received from a text authoring tool (e.g., by the NLP service 130 as described in FIG. 1, etc.). At operation 1515, the text may be processed as it is entered to identify part-of-speech in sentences of the text. In an example, the text may be processed by a natural language processing (NLP) parser to identify part-of-speech in a sentence, the identified part-of-speech may be tagged according to the part, and a text cascade that included sentence breaks and cascading that includes indentations defined by rules by applied to the part-of-speech. At operation 1515, display of the text may be modified in near real-time in the authoring tool according to text display rule for generation of a cascaded display. In an example, features of the cascaded display may be modified based on input received from an editing tool in the authoring tool that enables adjustment of the cascaded display. According to another example embodiment, the cascade text authoring tool is a grammar checking tool such as Grammarly® that provides cascade text output as well as grammar mark-ups and suggested corrections.

Figure 16:
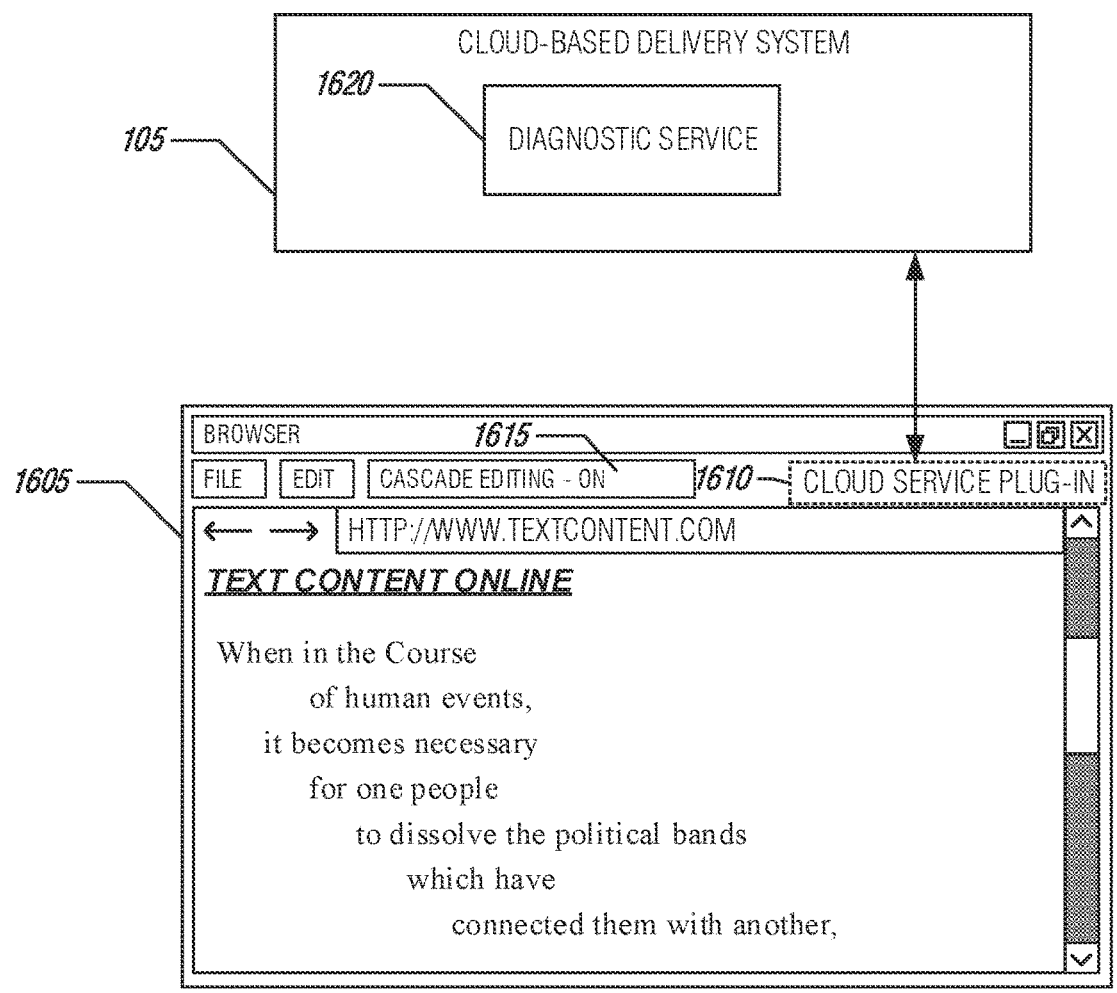
FIG. 16 illustrates an example of receiving modification to a cascade format, in accordance with one embodiment.

FIG. 16 illustrates an example of an environment 1600 for receiving modification to a cascade format, in accordance with one embodiment. A user interface 1605 and plug-in 1610 may provide features as described in FIGS. 1 through 5. The user interface 1605 and the plug-in 1610 may connect to the system 105 as described in FIG. 1. The system 105 may include a diagnostic service 1620 that may include instructions for diagnosing a condition based on modifications made to a cascade format as described in FIGS. 1-10. A cascade mode button 1015 may be provided that allows a user to turn editing mode on or off. Text may be displayed in a cascade format and when the cascade editing mode is enabled, changes to the cascade format may be tracked and may be analyzed to diagnose a medical condition and/or generate personalized cascade format rules for the user.

Figure 17:
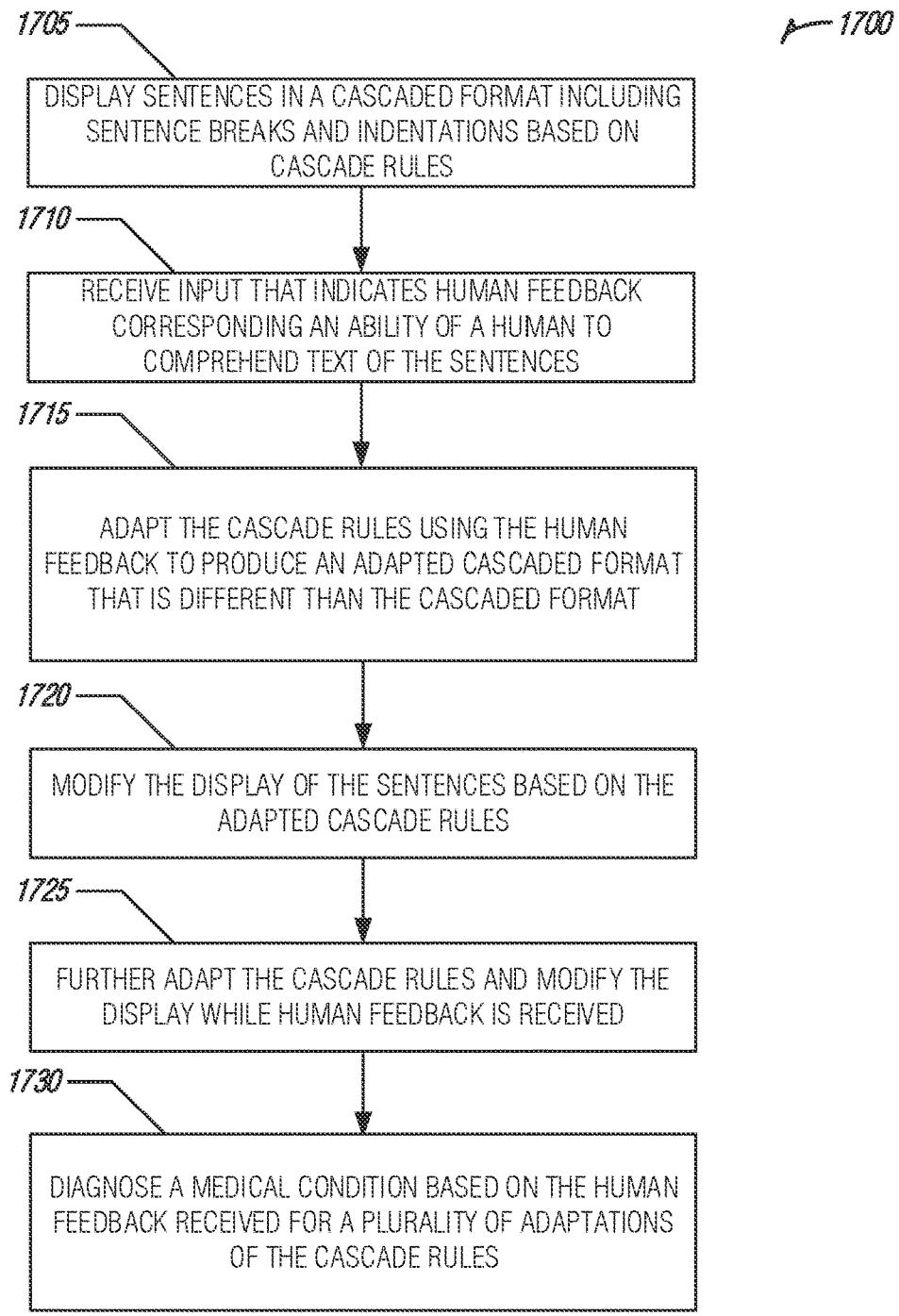
FIG. 17 illustrates a method for diagnosing a medical condition affecting the ability to read, in accordance with one embodiment.

FIG. 17 illustrates a method 1700 for diagnosing a medical condition affecting the ability to read, in accordance with one embodiment. The method 1700 may provide features as described in FIGS. 1 through 5. The systems and techniques discussed herein may also be used to diagnose conditions like Dyslexia and Concussions. For example, different cascades and modifications may be provided to facilitate the diagnosis of these and other conditions. A person may put on a headset and be exposed to various format parameters that sort through various factors which inform the condition. At operation 1705, sentences may be displayed in a cascaded format including sentence breaks and indentations based on cascade rules. At operation 1710, input may be received that indicates human feedback corresponding to an ability of a human to comprehend text of the sentences. In an example, the human feedback may indicate a change in spacing of sentence fragments, sentence fragment length, or both. Alternatively, the human feedback is provided by tracking the reader's eye movements across the text. At operation 1715, the cascade rules may be adapted using the human feedback to produce an adapted cascaded format that is different than the original cascaded format. At operation 1720, the display of the sentences may be modified based on the adapted cascade rules. At operation 1725, the cascade rules may be further adapted, and the display may be further modified while human feedback is received. At operation 1730, a medical condition may be diagnosed based on the human feedback received for a plurality of adaptations of the cascade rules.

Figure 18:
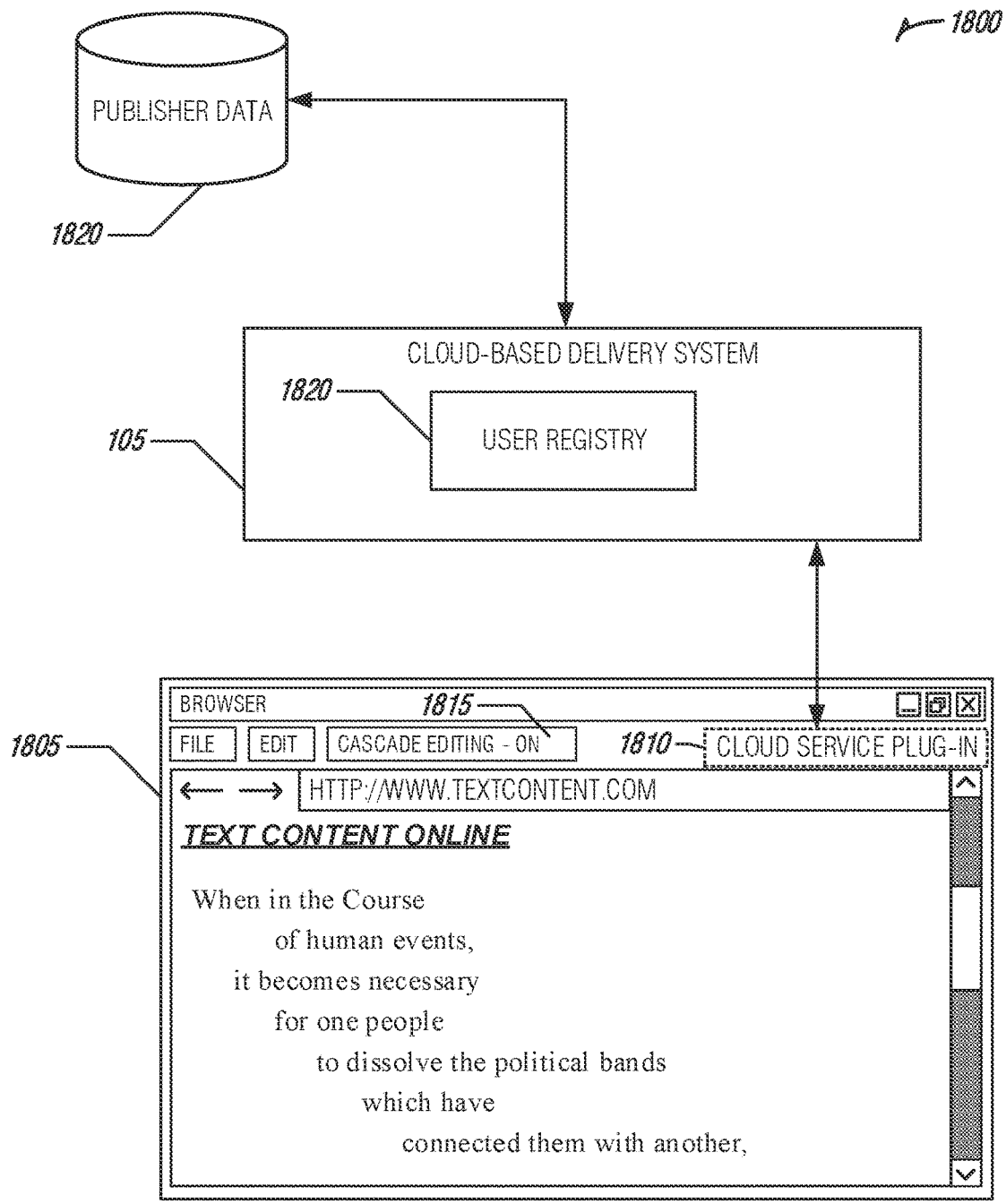
FIG. 18 illustrates an example of personalization of cascaded human-readable text using natural language processing based on feedback input, in accordance with one embodiment.

FIG. 18 illustrates an example 1800 of personalization of cascaded human-readable text using natural language processing based on feedback input, in accordance with one embodiment. The example 1800 may provide features as described in FIGS. 1 through 5. The user interface 1805 and the plug-in 1810 may connect to the system 105 as described in FIG. 1. The system 105 may include a user registry 1820 that may allow users and publishers to register to publish and consume text via the system 105. A cascade mode button 1015 may be provided that allows a user to turn editing mode on or off. Text may be displayed in a cascade format and when the cascade editing mode is enabled, changes to the cascade format may be tracked and may be evaluated to generate personalized cascade format rules for the user.

In an example, a publisher may register via the user registry 1810 and may provide published content for consumption by users of the system 105. Publisher data 1820 may include text including books, magazines, manuals, exams, etc. that may be input into the system 105. Part-of-speech and key phrases may be identified in the publisher data 1820 by an NLP parser based on predefined part-of-speech and key phrase data. In an example, a machine learning processor may identify unknown key phrases by processing publisher data 1820 to classify words or combinations of words as a key phrase. The publisher data 1820 including the part-of-speech and key phrases may be received by the system 105.

The identified part-of-speech and key phrases may be evaluated against a set of cascade formatting rules that may include rules for inserting line breaks, indentation, and other formatting elements into the publisher data 1820. The cascade formatting rules may be specific to a key word or part-of-speech or may be defined for a class or type of part-of-speech or key phrase. The cascaded publisher data may be provided back to the publisher to be included in the publisher data 1820 and may be consumed by a user via the user interface 1805.

Figure 19:
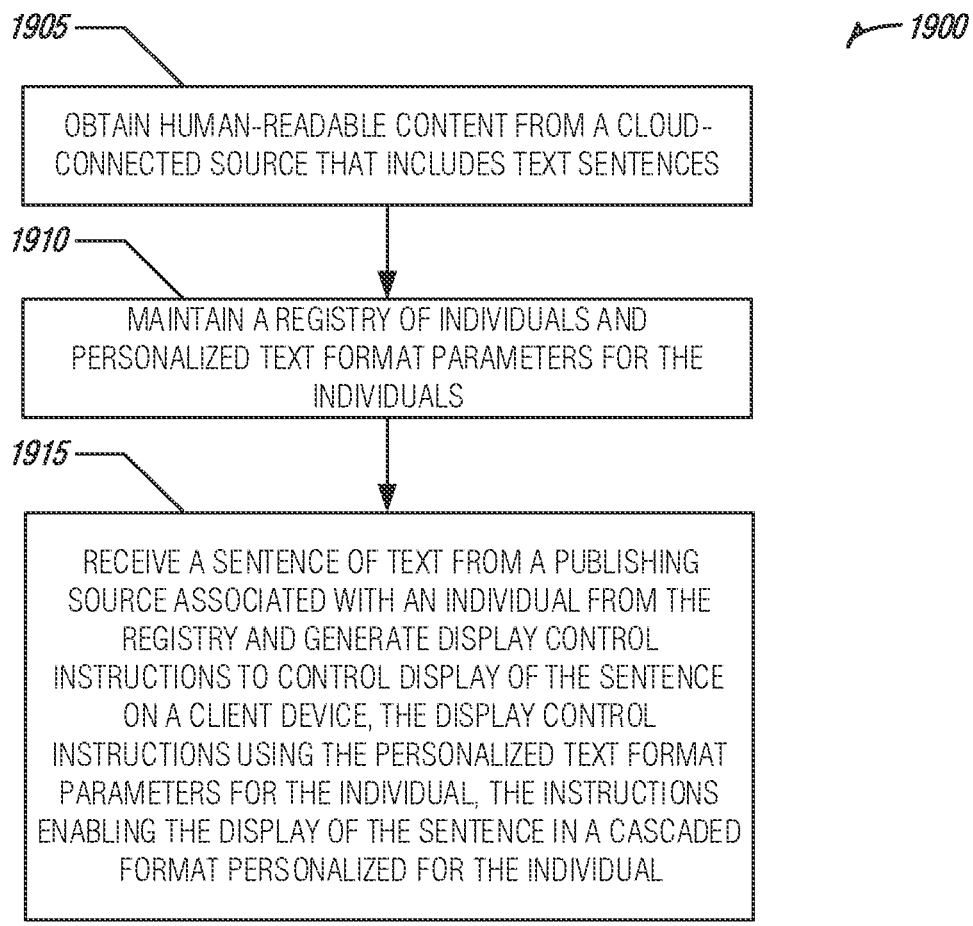
FIG. 19 illustrates a method for personalization of cascaded human-readable text using natural language processing based on feedback input, in accordance with one embodiment.

FIG. 19 illustrates a method 1900 for personalization of cascaded human-readable text using natural language processing based on feedback input, in accordance with one embodiment. The method 1900 may provide features as described in FIGS. 1 through 5. The systems and techniques discussed herein may be used to develop a personalized algorithm that is unique to an individual. People have different ways of processing textual information and a personal reading algorithm (PRA) may be created that is optimized for each person. By tweaking various attributes and assessing comprehension and ease of reading, a personalized setting may be developed that is used for formatting. This may be created by parameter changes of the output of the cascading text made by the user to the fit the way they desire to consume text. Adjustments that may be tracked may include user adjustment of controls, changes to existing formatting (e.g., non-cascade content), modification of the cascade with more or less indentation, one or two (or more) key phrases, cascade text adjustments including use user-specified parameters or adjustments to these parameters automatically made based on user history, etc.

For example, reading profiles may be created (standalone or in combination) that modify the cascade formatting based on reader context. Contextual profiles may be informed by user input or through computer-automated evaluation such as, for specific medical and cognitive conditions (e.g., Dyslexia, attention deficit and hyperactivity disorder (ADHD), attention deficit and disorder (ADD), etc.), native languages (e.g., a native Chinese speaker may benefit from a different format than a native Spanish speaker, etc.), the nature of content being read (e.g., fiction, non-fiction, news, poetry, etc.), screen modes (e.g., phone, tablet, laptop, monitor, AR/VR device, etc.). In an example, the diagnosis may be determined automatically using machine learning to generate models for various medical conditions and comparing metrics for the user to the models, etc. In another example, a user may set their own personal parameters and output formats (e.g., length, spacing, highlighting, indentation, line returns, etc.), font, color, size, background color.

At operation 1905, human-readable content may be obtained from a cloud-connected source that includes text sentences. At operation 1910, a registry of individuals and personalized text format parameters for the individuals. In an example, the text formatting parameters may include rules to generate a cascaded text display format personalized for an individual. At operation 1915, a sentence of text may be received from a publishing source associated with an individual from the registry and display control instructions may be generated to control display of the sentence on a client device. The display control instructions may use the personalized text format parameters for the individual and the instructions may enable the display of the sentence in a cascaded format personalized for the individual. In an example, the cloud-connected source may be a browser application, and the browser application may supply the sentence of text to the text processing engine.

Figure 20:
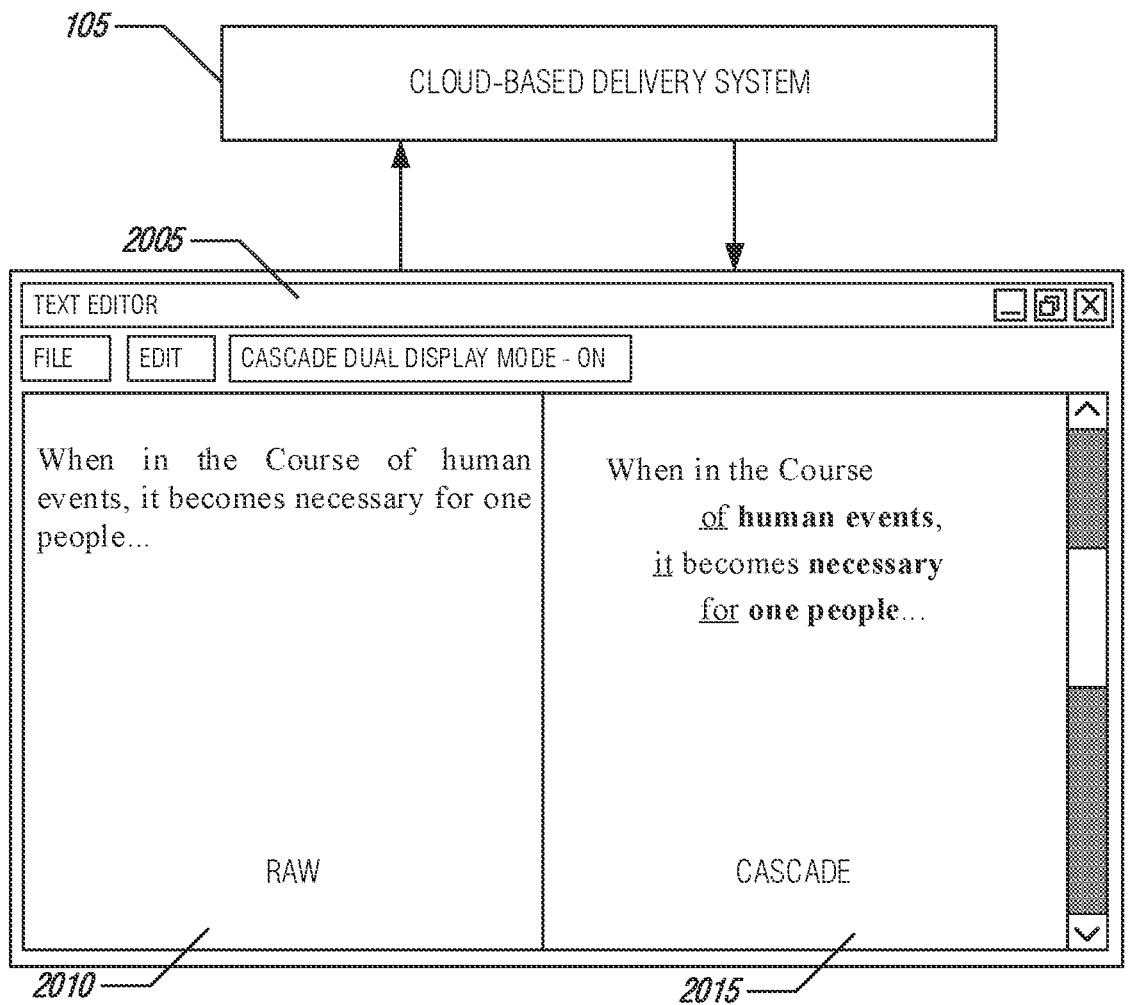
FIG. 20 illustrates an example of dual display of cascaded human-readable text using natural language processing based on feedback input, in accordance with one embodiment.

FIG. 20 illustrates an example 2000 of dual display of cascaded human-readable text using natural language processing based on feedback input, in accordance with one embodiment. The example 2000 may provide feature as described in FIGS. 1 through 5. Text may be received via a user interface 2005. The text 2010 may be processed by the system 105 to identify part-of-speech and key phrases. The text 2010 (e.g., non-cascaded, original language, cascaded, etc.) or source text may be displayed in a first windows of the user interface 2005. While block text is used as an example, the raw text may be text in a first language, cascaded text, a first cascaded format, etc. Modified text 2015 may be displayed in a second window of the user interface 2005. The modified text 2015 may be text that has been cascade formatted, translated, formatted in a different cascade format from that of the original text, etc. In an example, the modified text 2015 may be presented in a cascade format using line breaks and indentations from cascade formatting rules applied based on the identified part-of-speech and key phrases. The modified text 2015 may be presented with the part-of-speech and key phrases highlighted (e.g., underlined, bolded, colored, shaded, etc.) so that a user is able to identify the structure of the text 2010.

Figure 21:
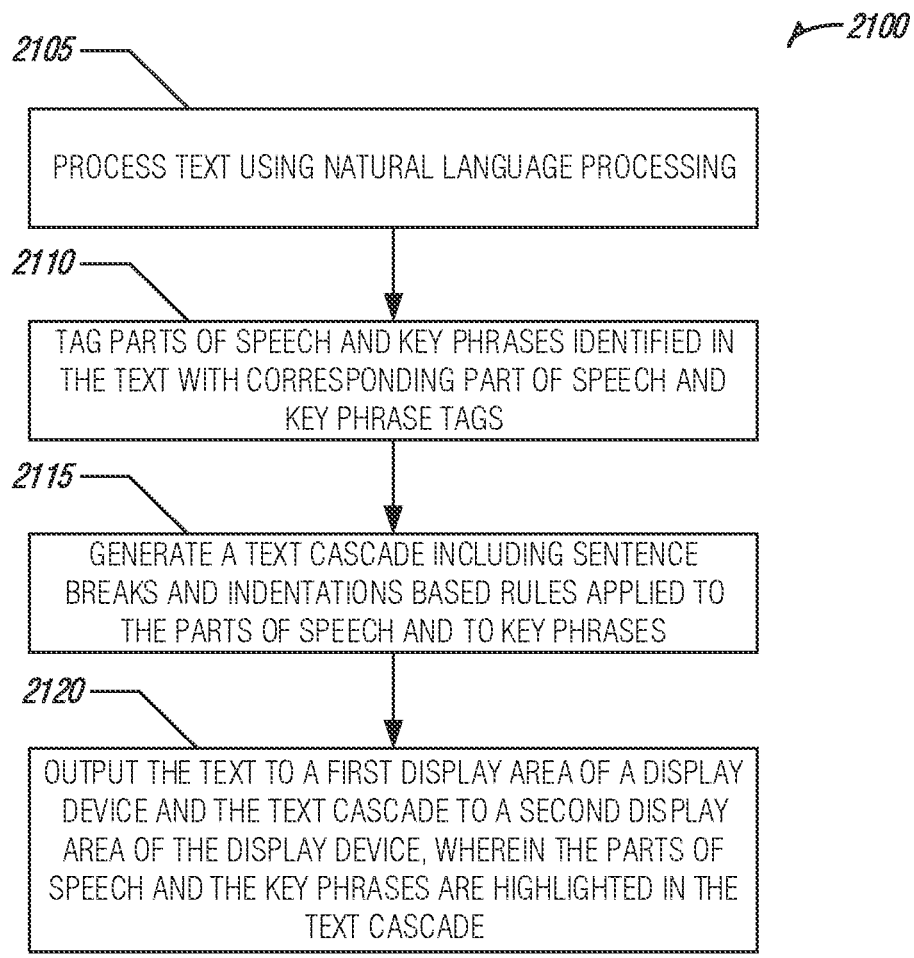
FIG. 21 illustrates a method for dual display of cascaded human-readable text using natural language processing based on feedback input, in accordance with one embodiment.

FIG. 21 illustrates a method 2100 for dual display of cascaded human-readable text using natural language processing based on feedback input, in accordance with one embodiment. The method 2100 may provide feature as described in FIGS. 1 through 5. At operation 2105, text may be processed using natural language processing (NLP) parser (e.g., by the NLP service 130 as described in FIG. 1, etc.). In an example, the NLP parser may be a neural network. In an example, the NLP parser uses probabilistic analysis to parse a sentence in the text. At operation 2110, part-of-speech and key phrases identified in the text may be tagged with corresponding part-of-speech and key phrase tags. At operation 2115, a text cascade may be generated that includes sentence breaks and indentations based on rules applied to the part-of-speech and key phrases.

At operation 2120, the text may be output to a first display area of a display device and the text cascade may be output to a second display area of the display device. The part-of-speech and the key phrases may be highlighted in the text cascade. In an example, the display device may be that of desktop computers, laptops, e-readers, tablet computers, watches, TV's, car screens, smartphones, graphical displays, user-worn visual display devices. In an example, the user-worn visual display devices include devices selected from the group: AV headsets, VR headsets, glasses, and contact lenses.

FIG. 22 illustrates an example of a dependency tree 2200 for natural language processing of text, in accordance with one embodiment. The dependency tree 2200 shows analysis of a quote. For each word, the arrows indicate which words are modified by it.

Figure 24:
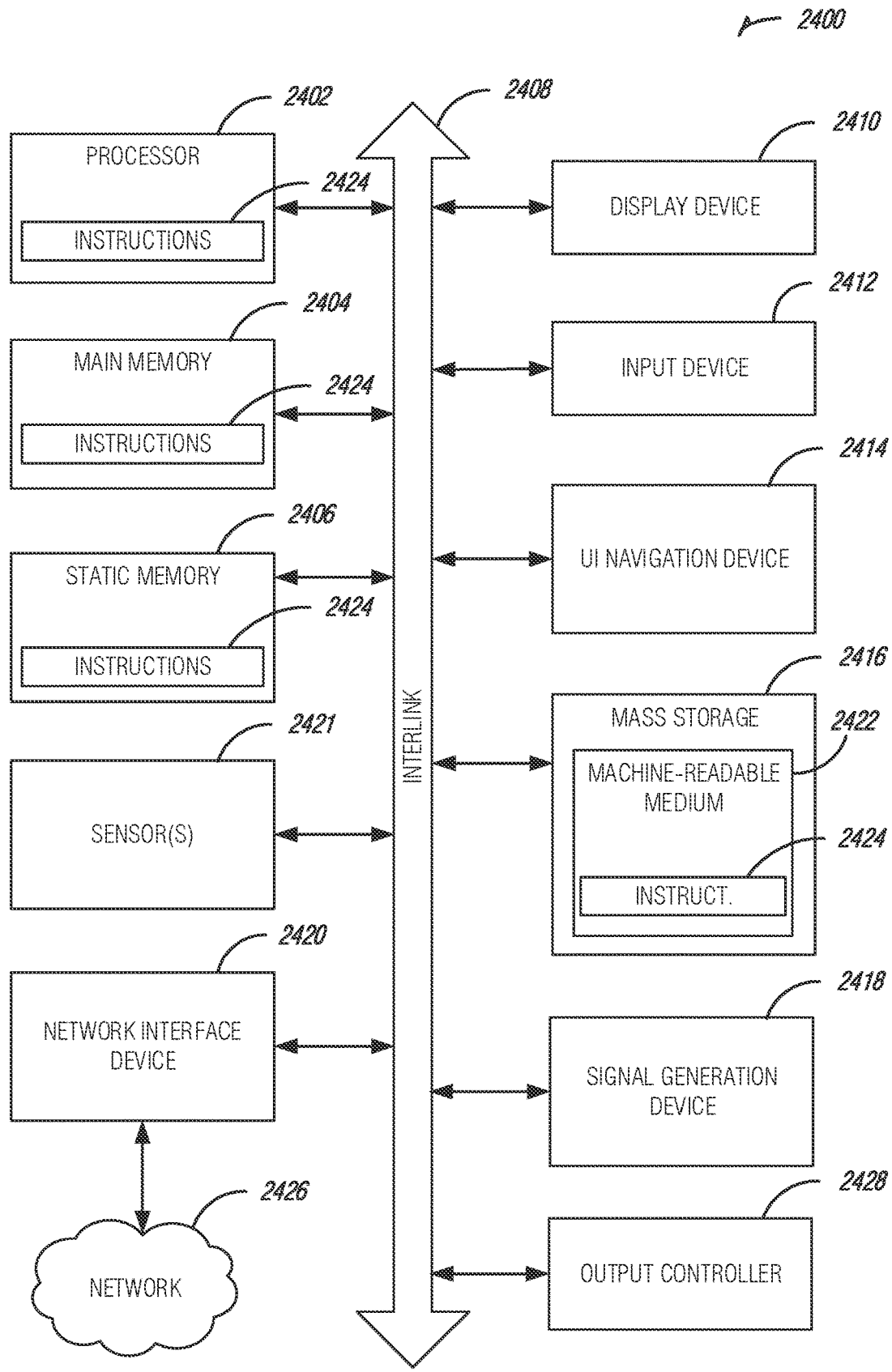
FIG. 24 is a block diagram illustrating an example of a machine upon which one or more embodiments may be implemented.

FIG. 24 illustrates a block diagram of an example machine 2400 upon which any one or more of the techniques (e.g., methodologies) discussed herein may perform. In alternative embodiments, the machine 2400 may operate as a standalone device or may be connected (e.g., networked) to other machines. In a networked deployment, the machine 2400 may operate in the capacity of a server machine, a client machine, or both in server-client network environments. In an example, the machine 2400 may act as a peer machine in peer-to-peer (P2P) (or other distributed) network environment. The machine 2400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 2400 may include a hardware processor 2402 (e.g., a central processing unit (CPU), a graphics processing unit (GPU), a hardware processor core, or any combination thereof), a main memory 2404 and a static memory 2406, some or all of which may communicate with each other via an interlink (e.g., bus) 2408. The machine 2400 may further include a display unit 2410, an alphanumeric input device 2412 (e.g., a keyboard), and a user interface (UI) navigation device 2414 (e.g., a mouse). In an example, the display unit 2410, input device 2412 and UI navigation device 2414 may be a touch screen display. The machine 2400 may additionally include a storage device (e.g., drive unit) 2416, a signal generation device 2418 (e.g., a speaker), a network interface device 2420, and one or more sensors 2421, such as a global positioning system (GPS) sensor, compass, accelerometer, or other sensors. The machine 2400 may include an output controller 2428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2416 may include a machine readable medium 2422 on which is stored one or more sets of data structures or instructions 2424 (e.g., software) embodying or utilized by any one or more of the techniques or functions described herein. The instructions 2424 may also reside, completely or at least partially, within the main memory 2404, within static memory 2406, or within the hardware processor 2402 during execution thereof by the machine 2400. In an example, one or any combination of the hardware processor 2402, the main memory 2404, the static memory 2406, or the storage device 2416 may constitute machine readable media.

While the machine readable medium 2422 is illustrated as a single medium, the term "machine readable medium" may include a single medium or multiple media (e.g., a centralized or distributed database, and/or associated caches and servers) configured to store the one or more instructions 2424.

The term "machine readable medium" may include any medium that is capable of storing, encoding, or carrying instructions for execution by the machine 2400 and that cause the machine 2400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2424 may further be transmitted or received over a communications network 2426 using a transmission medium via the network interface device 2420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 2420 may include one or more physical jacks (e.g., Ethernet, coaxial, or phone jacks) or one or more antennas to connect to the communications network 2426. In an example, the network interface device 2420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2400, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method for displaying sentences of human-readable text in a cascaded format, the method comprising:
    generating a customized cascade of a sentence with iterative operations including:
        a) parsing a text to identify linguistic constituents associated with each word in the sentence;
        b) tagging the identified linguistic constituents;
        c) applying cascade rules to the linguistic constituents to generate instructions that display the sentence in a cascaded format, wherein the sentence breaks and cascading including indentations are defined by the cascade rules;
        d) receiving input relating to a context of a user, the input captured in response to the display of the sentence to the user, wherein the context of the user includes a type of a display device used to provide the display of the sentence, and wherein the input includes a measurement of eye fixation and eye movement that is used to measure the ability of the user to comprehend a sentence displayed using the cascade rules in the type of the display device;
        e) generating personalized text formatting parameters for the user based on the context of the user including the type of the display device and the measurement of the eye fixation and eye movement of the user;
        f) applying the personalized text formatting parameters to the sentence to generate instructions that change the display of the sentence into an adapted cascaded format, wherein the personalized text formatting parameters provide visual enhancement to the display of the sentence while maintaining the sentence breaks and cascading including indentations that are defined by the cascade rules,
    wherein the personalized text formatting parameters are based on a single individual profile corresponding to the user, and the personalized text formatting parameters are adapted specifically for the single individual profile, wherein the visual enhancement identifies linguistic structure including one or more of syntax, a key phrase, or a part-of-speech, wherein the visual enhancement is customized to the type of the display device, and wherein the visual enhancement comprises text formatting from one or more of: sentence spacing, font, highlighting, font color, font size, or background color of the sentence; and
        g) repeating operations d) through f) until a stop criteria is met; and
    rendering the display of the customized cascade of the sentence in a user interface of the display device, using the cascade rules and the personalized text formatting parameters.

2. The method of claim 1 wherein the stop criteria is provided from one of: a number of times the operations d) through f) are repeated; an input received by the user; or a determination that the personalized text formatting parameters are not improving readability of the text.

3. The method of claim 1, the iterative operations further including:
    parsing the text to identify key phrases and entities in the sentence;
    tagging the identified key phrases and entities; and
    applying the cascade rules to the key phrases and entities to generate key phrase and entity instructions used to display the sentence in the cascaded format, wherein displaying the sentence in fragments in the cascaded format includes using the key phrase and entity instructions.

4. The method of claim 1, wherein the display device is a head-worn display device, and wherein the head-worn display device is configured to track the eye fixation and eye movement of the user.

5. The method of claim 4, wherein the head-worn display device is one of: smart glasses, smart contact lenses, an augmented reality headset, or a virtual reality headset.

6. The method of claim 1, wherein the eye fixation and eye movement is tracked across a display of a plurality of sentences.

7. The method of claim 1, wherein the visual enhancement to the display of the sentence includes one or more of bolding, color, or highlighting of at least a portion of the sentence.

8. The method of claim 7, wherein the visual enhancement to the display of the sentence provides an emphasis on one or more words in the sentence for educational purposes by adding the visual enhancement to reflect pre-determined linguistic characteristics of the sentence.

9. A method for diagnosing a medical condition affecting a reading ability of a human subject, comprising:
generating a customized cascade of sentences for output in a display device used by the human subject, with iterative operations including:
a) displaying sentences in a cascaded format to the human subject via the display device, wherein sentence breaks and cascading including indentations are defined by cascade rules;
b) receiving input relating to a context of the human subject, the input captured in response to the displaying of the sentences to the human subject, wherein the context of the human subject includes a type of the display device used to output the sentences, and wherein the context of the human subject includes a measurement of eye fixation and eye movement that is used to measure the ability of the human subject to comprehend the sentences;
c) generating personalized text formatting parameters for the human subject based on the context of the human subject including the type of the display device and the measurement of the eye fixation and eye movement of the human subject;
d) applying the personalized text formatting parameters to change the displaying of the sentences into an adapted cascaded format, wherein the personalized text formatting parameters provide visual enhancement to the displaying of the sentences while maintaining the sentence breaks and cascading including indentations that are defined by the cascade rules,
wherein the personalized text formatting parameters are based on a profile associated with the human subject, and the personalized text formatting parameters are adapted specifically for the profile,
wherein the visual enhancement identifies linguistic structure including one or more of syntax, a key phrase, or a part-of-speech, wherein the visual enhancement is customized to the type of the display device, and wherein the visual enhancement comprises text formatting from one or more of: sentence spacing, font, highlighting, font color, font size, or background color of the sentence; and
e) repeating operations b) through d) until a stop criteria is met; and
generating a data output used to diagnose a medical condition, using the eye fixation and eye movement of the human subject, in response to presenting a plurality of display adaptations to the cascade of sentences in the display device.

10. The method of claim 9, wherein the stop criteria is provided from one of: a number of times the operations b) through d) are repeated; an input received from the human subject; or a determination that the personalized text formatting parameters are not improving readability of the sentences.

11. The method of claim 9, wherein the display device is a head-worn display device, and wherein the head-worn display device includes at least one sensor to track the eye fixation and eye movement of the human subject.

12. The method of claim 11, wherein the head-worn display device is one of: smart glasses, smart contact lenses, an augmented reality headset, or a virtual reality headset.

13. The method of claim 9, wherein the eye fixation and eye movement is tracked across a display of a plurality of the sentences.

14. The method of claim 9, wherein the visual enhancement to the displaying of the sentences includes one or more of bolding, color, or highlighting of at least a portion of the sentences.

15. The method of claim 14, wherein the visual enhancement to the displaying of the sentence provides an emphasis on one or more words in the sentences for educational purposes by adding the visual enhancement to reflect pre-determined linguistic characteristics of the sentences.

* * * * *